May 4, 1926.

C. H. HOYT 1,583,044

MACHINE FOR USE IN THE MANUFACTURE OF SHOES

Filed July 23, 1921  12 Sheets-Sheet 1

INVENTOR
Charles H. Hoyt

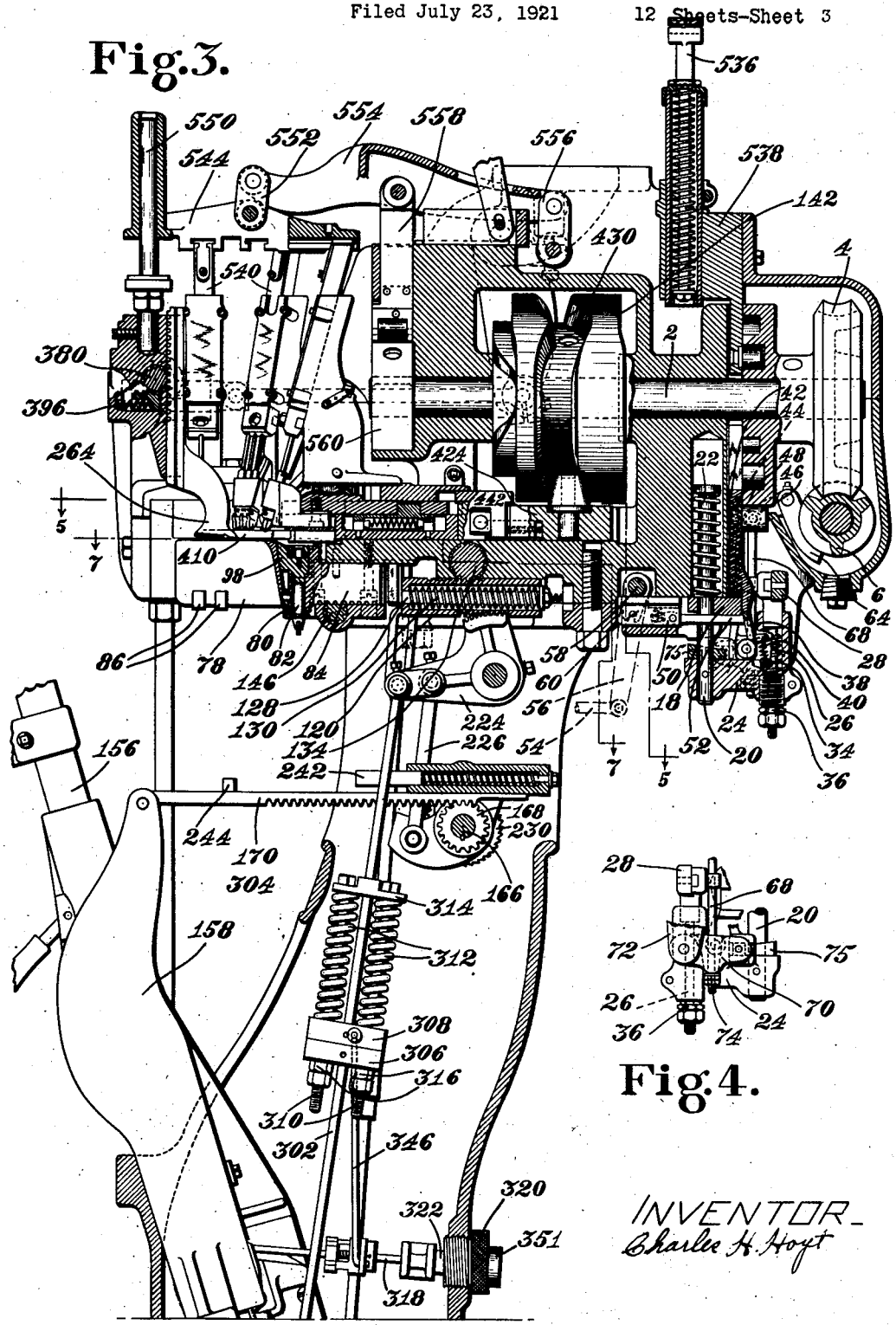

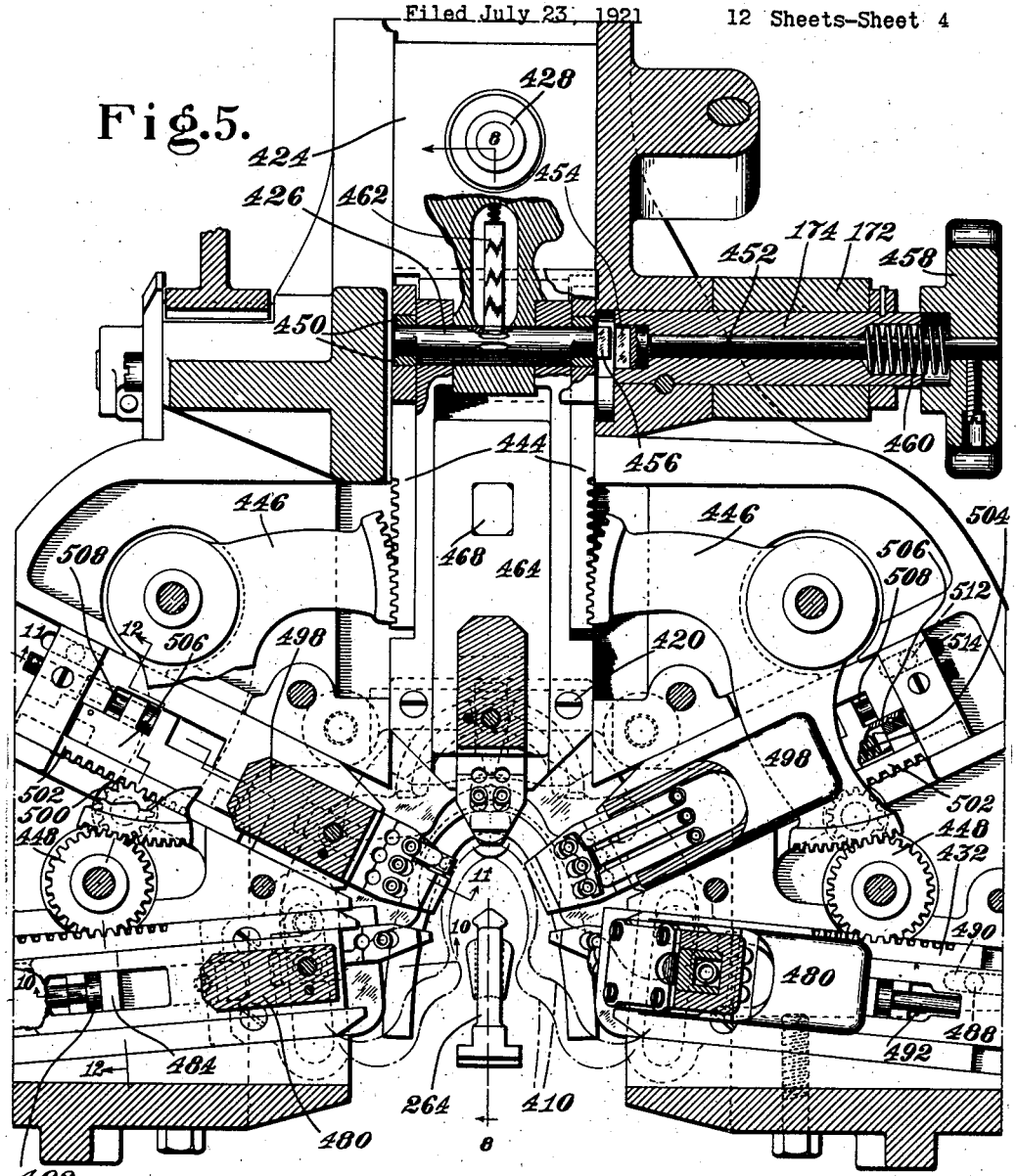

May 4, 1926.

C. H. HOYT 1,583,044

MACHINE FOR USE IN THE MANUFACTURE OF SHOES

Filed July 23, 1921   12 Sheets-Sheet 6

INVENTOR
Charles H. Hoyt

May 4, 1926. 1,583,044
C. H. HOYT
MACHINE FOR USE IN THE MANUFACTURE OF SHOES
Filed July 23, 1921    12 Sheets-Sheet 7

INVENTOR
Charles H. Hoyt

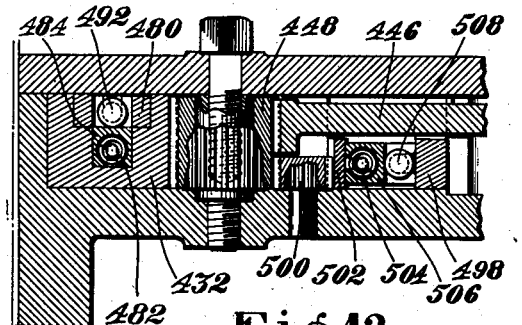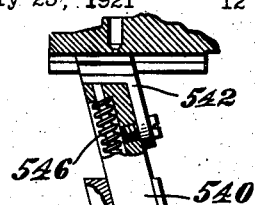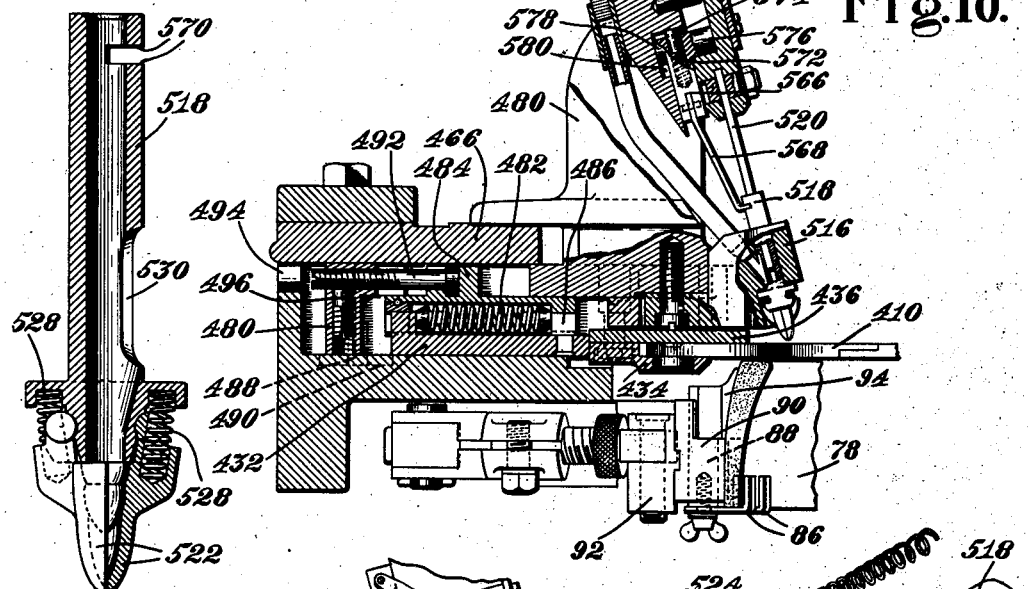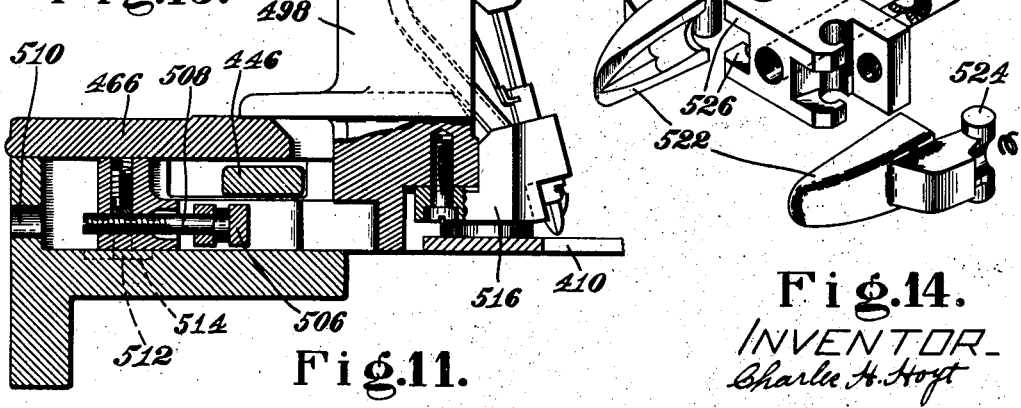

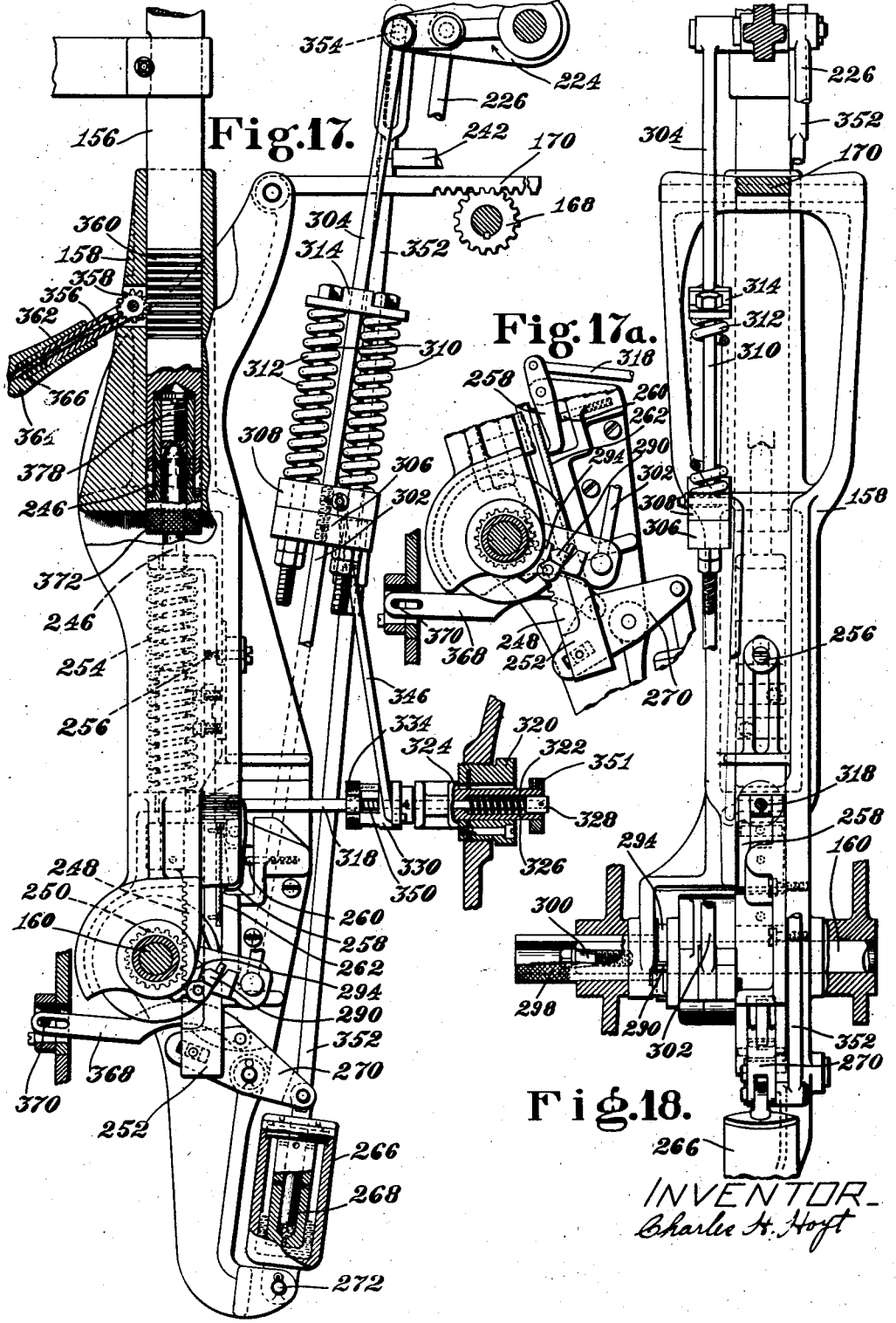

May 4, 1926.

C. H. HOYT 1,583,044

MACHINE FOR USE IN THE MANUFACTURE OF SHOES

Filed July 23, 1921   12 Sheets-Sheet 10

INVENTOR
Charles H. Hoyt

May 4, 1926.
C. H. HOYT
1,583,044
MACHINE FOR USE IN THE MANUFACTURE OF SHOES
Filed July 23, 1921     12 Sheets-Sheet 11
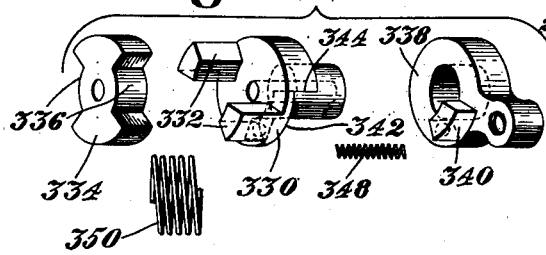
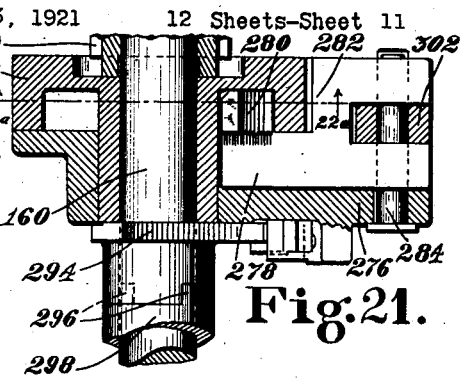
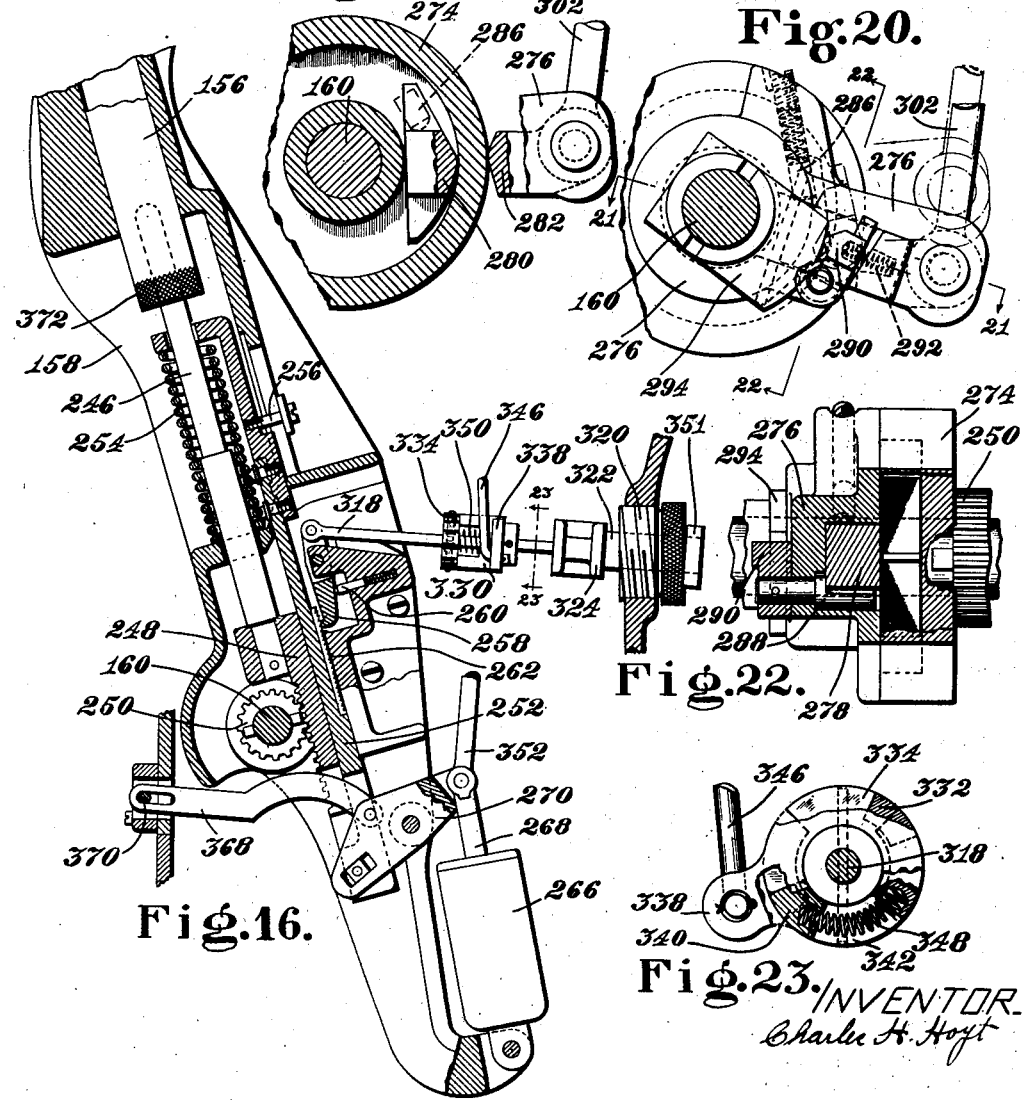

May 4, 1926.
C. H. HOYT
1,583,044
MACHINE FOR USE IN THE MANUFACTURE OF SHOES
Filed July 23, 1921. 12 Sheets-Sheet 12
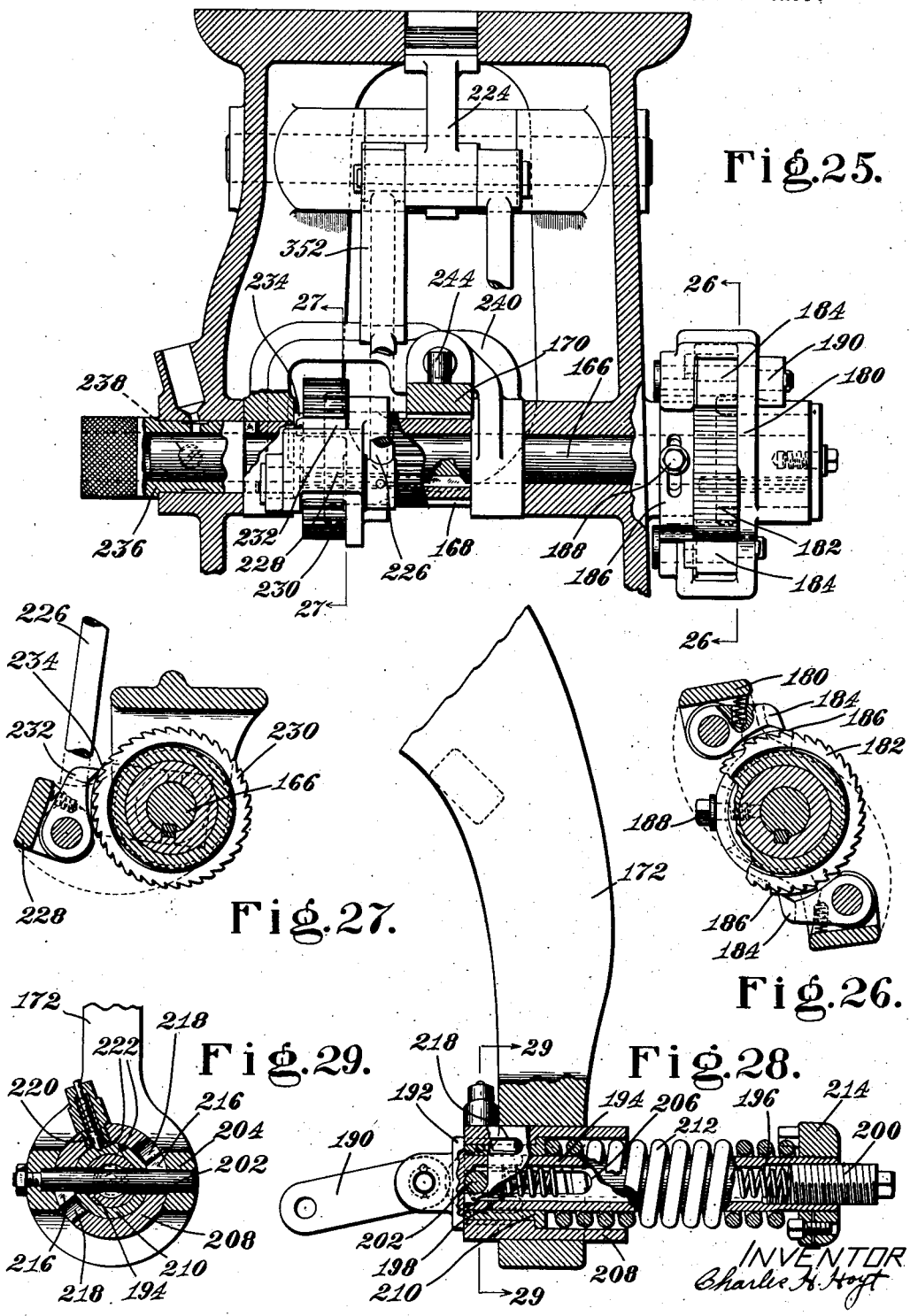
INVENTOR
Charles H. Hoyt Patented May 4, 1926.

1,583,044

UNITED STATES PATENT OFFICE.

CHARLES H. HOYT, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF SHOES.

Application filed July 23, 1921. Serial No. 487,098.

*To all whom it may concern:*

Be it known that I, CHARLES H. HOYT, a citizen of the United States, residing at Beverly, in the county of Essex and State of Massachusetts, have invented certain Improvements in Machines for Use in the Manufacture of Shoes, of which the following description, in connection with the accompanying drawings, is a specification, like reference characters on the drawings indicating like parts in the several figures.

This invention relates to machines for use in the manufacture of boots and shoes, and is herein illustrated in its application to machines for lasting the heel ends of shoes, commonly known as heel seat lasting machines. It will be recognized, however, that in many of its important features and aspects the invention is not limited to the particular type of machine illustrated, but is generally applicable to machines of various kinds.

As applied to machines including in their organization means for wiping the margin of the upper inwardly over the bottom of a shoe and means for driving tacks or like fastenings to secure the margin of the upper, of which the machine herein shown is an example, the invention provides a novel organization of wiping and tacking mechanisms designed with the general object of securing better coordination than heretofore between the operations of the different mechanisms and better control of the mechanisms. Among the various features of the invention which are to be recognized in this novel organization are included a novel construction and arrangement of means for moving tacker mechanism inwardly over a shoe in predetermined relation to the overwiping means, novel means for controlling and for limiting such inward movement of the tacker mechanism, novel tacker adjusting means, and a novel construction and arrangement designed to prevent objectionable strain on the tacker mechanism through pressure of the shoe on the wiping means. As an embodiment of these and other features the machine herein shown comprises end embracing wipers and a plurality of tackers at each side of the end of the shoe which are moved yieldingly inward in converging paths by the wiper operating mechanism and are positioned yieldingly for the tacking operations in locations determined by the position of the wipers, together with means for limiting the inward movements of the tackers while the wipers continue their inward movement in one or more overwiping operations, and adjusting devices whereby the wipers and the tackers may be adjusted laterally of the shoe together and whereby different tackers may also be adjusted independently in relation to the wipers. To prevent objectionable strain on the tackers the machine has thrust plates which are positioned over the wipers and spaced from the tackers to support the wipers against the pressure of the shoe materials.

A further important feature of the invention consists in a novel organization of wiping and tacking means including a tack holder or throat which is moved toward the plane of the shoe bottom for the tacking operation. As applied for example, to a machine wherein the wiping means is moved inwardly between the tacking means and the shoe beyond the tacking location before it is positioned for the tack driving operation, this feature of the invention has the important advantage that the tack holder may be positioned clear of the wiping means without detriment to its control of the tack in the tacking operation and without the necessity for using longer tacks than are desirable in order to insure proper control of the tacks.

While the machine herein shown is designed for driving lasting tacks, it will be recognized that in many of its features and aspects the invention is not limited to the use of fastenings of any particular kind. It should accordingly be understood that the term "tacker" and similar terms, unless required by the context, are not used herein by way of limitation but merely as convenient terms for purposes of designation.

A further feature of the invention consists in novel means for positioning or jacking a shoe in relation to means for operating on the shoe. In machines of the type illustrated it has been necessary heretofore, after swinging the jack rearwardly to carry the shoe toward the lasting mechanism and under the holddown, to jack the shoe upwardly against the holddown by means of a treadle before the machine is started. The present invention provides automatic means for thus jacking the shoe, the construction shown comprising spring mechanism which is tripped by the rearward movement of the jack and the shoe to render it operative to jack the shoe, together with means automatically operative subsequently to restore said spring mechanism to its original condition ready for the jacking operation on another shoe. Included in this part of the invention are also novel means for retarding the jacking movement of a shoe support and means for restoring the jacking mechanism to its original condition in the event that the operator finds it necessary to move the shoe support reversely to withdraw the shoe before the machine is started.

Still other features of the invention are to be recognized in novel means for operating and controlling end embracing wipers and for adjusting the wipers, novel means for varying the pressure applied to a shoe support to position the shoe, and novel holddown adjusting mechanism.

The above and other features of the invention, including various details of construction and combinations of parts, will now be described with reference to the accompanying drawings and pointed out in the claims.

In the drawings:

Fig. 3 is a vertical central section through the upper portion of the machine from front to back;

Fig. 4 shows in side elevation a portion of the starting and stopping means as viewed from the opposite side with reference to Fig. 3;

Fig. 5 is a section substantially on the line 5—5 of Fig. 3, showing the wiping and tacking mechanisms;

Fig. 10 is a view partly in front elevation and partly in section on the line 10—10 of Fig. 5;

Fig. 11 is a section substantially on the line 11—11 of Fig. 5;

Fig. 12 is a section substantially on the line 12—12 of Fig. 5;

Fig. 13 is a sectional view of one of the tack holders;

Fig. 14 shows the parts of one of the tack holders in disassembled relation;

Fig. 16 is a vertical section through the lower portion of the shoe jacking mechanism;

Fig. 17 shows the shoe jacking mechanism partly in side elevation and partly in vertical section, with the parts differently positioned;

Figure 19:
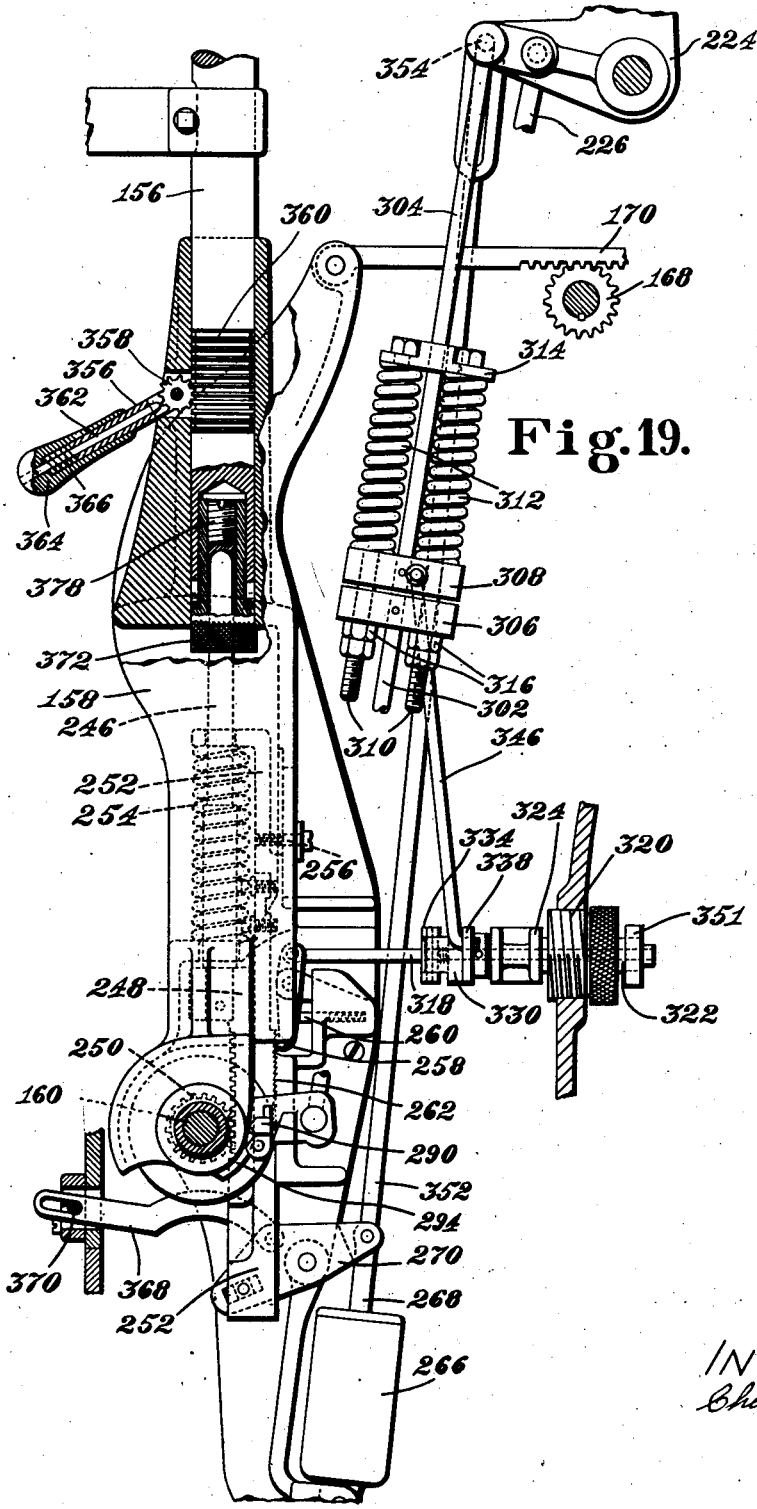
Figure 19A:
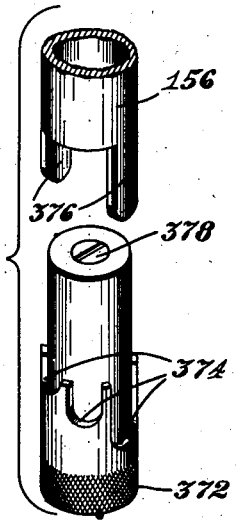

Fig. 17$^a$ is a side elevation of the lower end portion of the mechanism shown in Fig. 17, with the parts in another position;

Fig. 18 shows the jacking mechanism of Fig. 17 substantially in rear elevation, with portions in section;

Fig. 19 is a view similar to Fig. 17, showing the parts in still another position;

Fig. 19$^a$ is a perspective view of portions of the jack in disassembled relation;

Fig. 20 is a side elevation of a portion of the mechanism provided for elevating the shoe supporting standard;

Fig. 21 is a section substantially on the line 21—21 of Fig. 20;

Fig. 22 is a section on the line 22—22 of Fig. 20;

Fig. 22$^a$ is a section on the line 22$^a$—22$^a$ of Fig. 21;

Fig. 23 is a section substantially on the line 23—23 of Fig. 16;

Fig. 24 shows in disassembled relation the parts shown in Fig. 23;

Fig. 25 is a view substantially in vertical section showing a portion of the mechanism for jacking the shoe and for operating the heel clamping band;

Fig. 26 is a section substantially on the line 26—26 of Fig. 25;

Fig. 27 is a section substantially on the line 27—27 of Fig. 25;

Fig. 28 is a view partly in side elevation and partly in vertical section, showing a portion of the power means provided for imparting to the jack its preliminary rearward movement to force the shoe yieldingly into the heel band;

Fig. 29 is a section substantially on the line 29—29 of Fig. 28; and

Fig. 30 is a plot of the operating cams, illustrating the timing of the different operations of the machine.

By way of example, the invention is herein shown as embodied in a machine of the same general type as that shown in United States Letters Patent No. 1,129,881, granted on March 2, 1915, upon an application of R. F. McFeely, and including also in its organization many features shown and described in another McFeely Patent No. 1,558,737, granted on October 27, 1925, and in Patent No. 1,508,394 granted upon my application on September 16, 1924. Generally speaking, the machine herein shown, like prior machines of the same general type, includes in its organization heel seat wiper and tacker mechanisms for wiping the margin of the upper over the heel seat and fastening it in lasted position, and means for positioning and holding the shoe for the wiping and tacking operations, the shoe positioning means comprising a heel embracing band and a jack which is operated to force the shoe backwardly into the band and through which, in co-operation with a holddown, vertical movements of the shoe are effected in time relation to the operation of the wipers, as will be hereinafter more particularly described.

Figure 1:
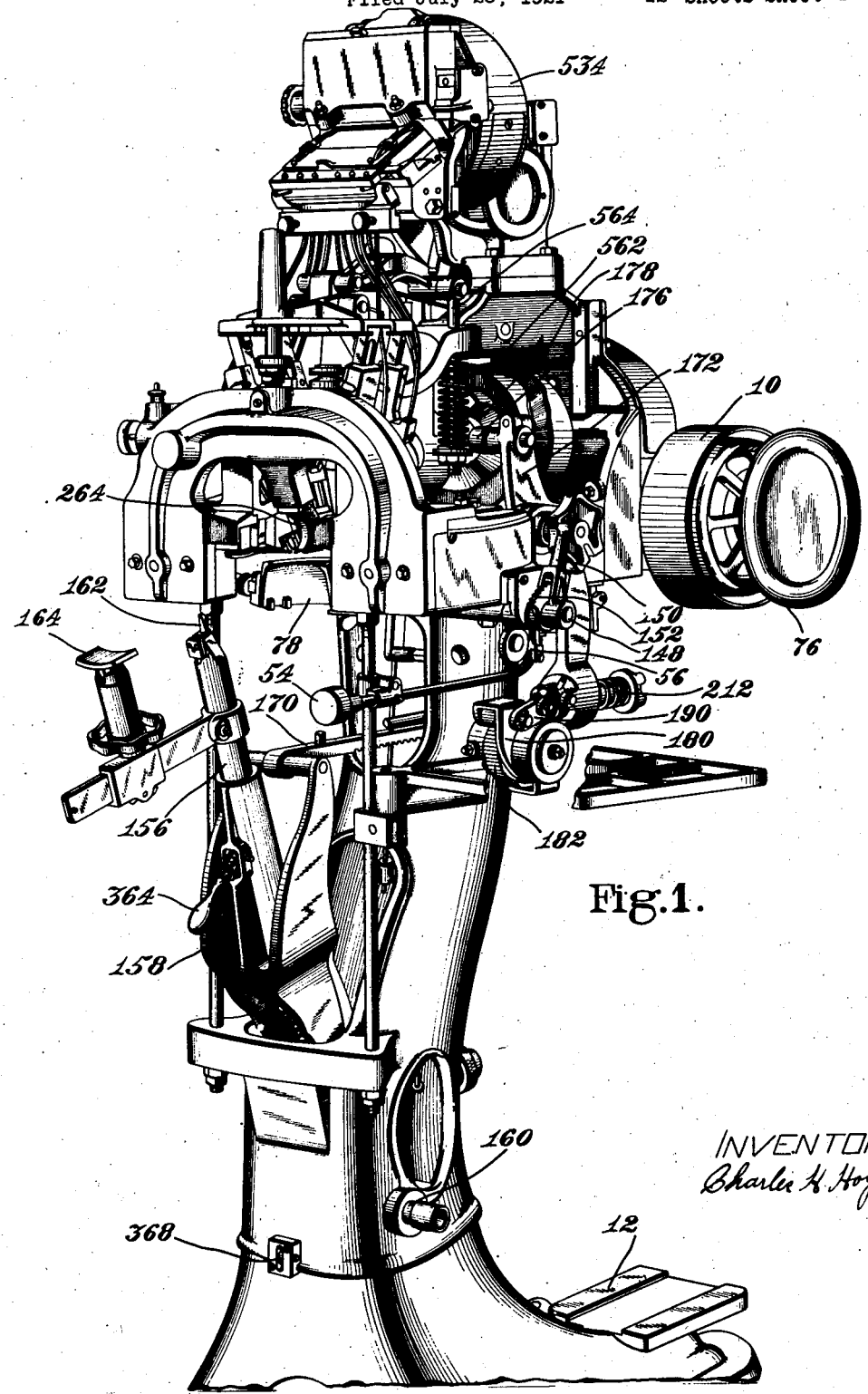
Fig. 1 is a perspective view of a machine in which the invention is embodied.
Figure 6:
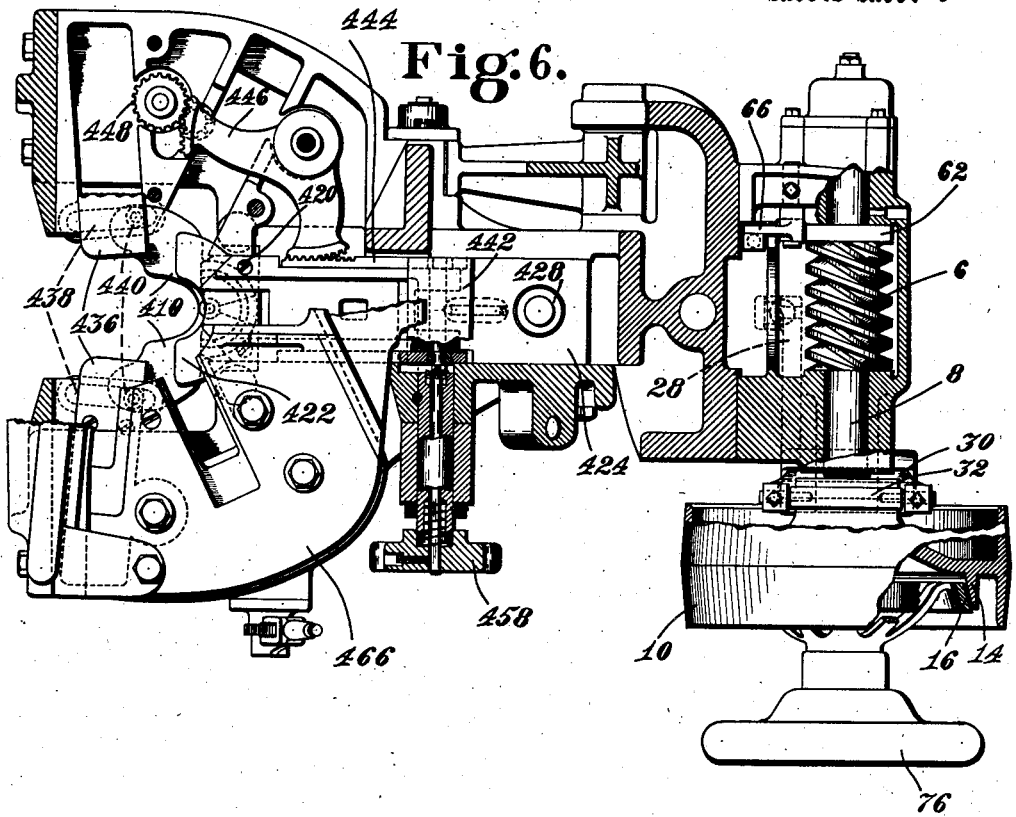
Fig. 6 is a horizontal section with parts broken away, further illustrating the wiping mechanism and showing also details of the power driving means.
Figures 7, 15:
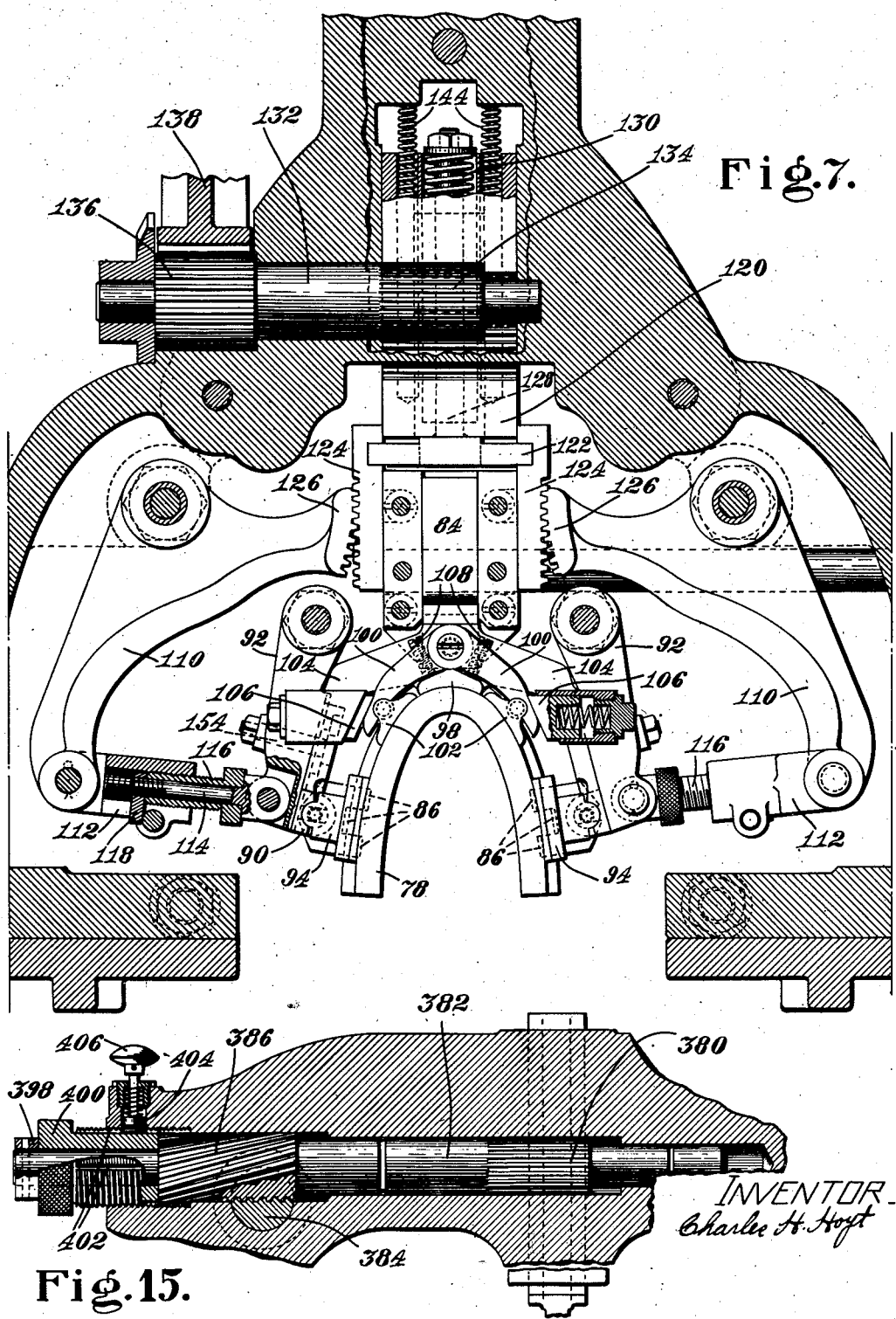
Fig. 7 is a section substantially on the line 7—7 of Fig. 3, showing the heel band and its operating mechanism.
Fig. 15 is a vertical section through a portion of the holddown operating mechanism.

Operative movements are imparted to the various instrumentalities by means of cams on a cam shaft 2 which in the present machine is driven and controlled through a simple and compact arrangement of mechanism illustrated in Figs. 3, 4 and 6. Fast on the rear end of the cam shaft 2 is a worm gear 4 which is driven by a worm 6 on a transverse driving shaft 8, the latter having loosely mounted thereon a pulley 10 which may be operated from any suitable source of power as, for example, an electric motor mounted on a support 12 on the base of the machine. The pulley 10 has a clutch ring 14 arranged to be engaged by a co-operating clutch member 16 which is fast on the shaft 8. For controlling the clutch the machine has mechanism which in some respects is similar to the controlling mechanism shown and described in United States Letters Patent No. 791,986, granted on June 6, 1905, upon an application of R. F. McFeely, and in other respects comprises a novel organization. For the purposes in view there is slidably mounted in a fixed plate 18 (Fig. 3) a rod 20 which is forced upwardly by a spring 22 and has fast on its lower end a block 24. Slidably mounted in the block 24 is a rod 26 the upper end of which is connected to an arm 28 extending rigidly from the lower end of a pivoted yoke member 30 which is connected to a thrust ring 32 engaging the pulley 10. A spring 34 bears upwardly on the enlarged head portion of the rod 26 and affords a yielding connection between the rod and the block 24, the normal vertical position of the rod in the block being determined adjustably by a stop nut 36 on the lower end of the rod. Pivoted on the block 24 is a tripping member or pawl 38 normally held by a spring 40 with its upwardly extending finger under the lower end of a cam slide 42 which is pressed upwardly by springs 44 abutting against the plate 18 and carries a roll 46 in engagement with a peripheral cam 48 on the shaft 2. When the parts are positioned as illustrated in Fig. 3 the cam 48, through the cam slide 42 and the pawl 38, holds the block 24 in its lowermost position wherein it maintains the lever arm 28 depressed with the yoke member 30 turned into position to release the pulley 10 from clutch setting pressure, thus permitting the pulley to turn idly on the shaft. For starting the machine there is provided a slide 50 which carries a pivoted spring controlled finger 52 the rear end of which is arranged to engage the upwardly extending finger of the pawl 38. To operate the slide 50 the machine has a push rod 54 (Fig. 1) connected to a lever arm 56 on a rock shaft 58 which carries a forked arm 60 engaging a pin on the slide 50. It will thus be evident that upon rearward movement of the push rod 54 the parts 50 and 52 are operated to push the pawl 38 from beneath the cam slide 42, thus releasing the block 24 to the operation of the spring 22 which forces the block upwardly and through the spring 34 acts yieldingly on the lever arm 28 to swing the yoke 30 and force the pulley into operative engagement with the clutch member 16. Through the resulting movement of the shaft 2 the cam 48 permits the springs 44 to force the cam slide 42 upwardly until the pawl 38 is again swung by its spring 40 beneath the lower end of the cam slide, and as the shaft approaches the end of its revolution the slide is again depressed by its cam and forces the block 24 downwardly to withdraw the yoke member 30 again from the clutch setting position, thus disconnecting the shaft 8 from the source of power.

Mounted also on the shaft 8 is a brake drum 62 co-operating with which is a pivoted brake shoe 64. An arm 66 fast on the brake shoe 64 is connected to a rod 68 which extends downward loosely through a lever 70 pivoted at one end to a lug 72 on the frame of the machine and connected at its other end by a sliding pivot block to the block 24, the rod 68 having on its lower end a stop nut 74 for engagement with the lever 70. Through these connections the block 24 in its downward clutch releasing movement operates the rod 68 to apply the brake with a force determined by the adjustment of the nut 74, and when the block 24 is tripped as above described to set the clutch the brake is simultaneously released by the upward movement of the lever 70. The lever connection thus provided affords quick and effective means for applying the brake in time relation to the release of the clutch to stop the machine at the end of each operating cycle. As a safety device to render the starting means ineffective to start the machine when desired, and to permit the clutch to be released without applying the brake in case the machine should stop before it completes its cycle, a wedge block 75 is mounted on the block 24 to operate substantially as described in Letters Patent No. 1,193,576, granted on August 8, 1916, upon an application of R. F. McFeely. In order to permit the shaft 2 to be turned manually if desired, at any time when the machine is disconnected from the source of power, the shaft 8 is provided at its outer end with a hand wheel 76.

Novel features of this starting and stopping mechanism are claimed in a divisional application Serial No. 601,595 filed on November 17, 1922.

Figure 8:
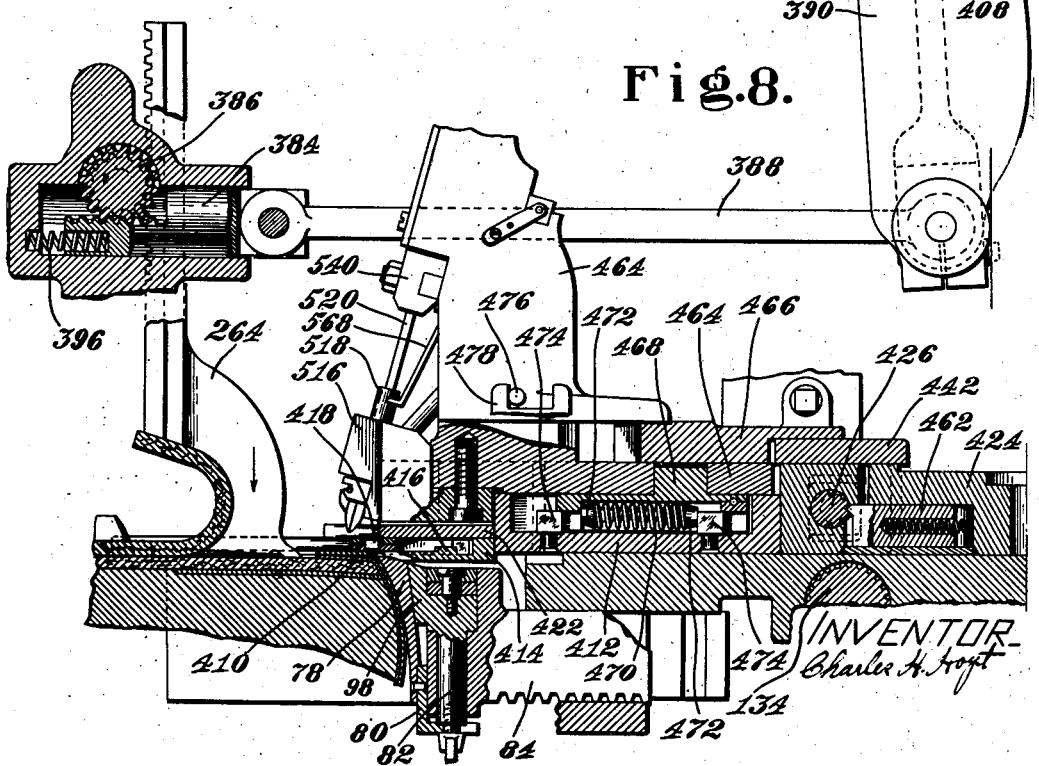
Fig. 8 is a vertical section substantially on the line 8—8 of Fig. 5, showing the wipers closed fully over the heel seat prior to the tacking operation and disclosing also a portion of the holddown operating means.

The heel end clamping means herein shown is in many of its features substantially like the clamping means shown and described in Patent No. 1,508,394. To receive and embrace the heel end of the shoe a flexible heel band 78 is supported at its rear end by a clip 80 which is secured to a stud 82 mounted for vertical movement in a carrier slide 84. The opposite side portions of the band are slidingly supported by clips 86 which are fast on studs 88 (Fig. 10) vertically and rotatably movable in supporting slides 90 which are mounted on horizontally swinging arms 92. To assist in pressing the band against the sides of the shoe in conformity to the contour of the shoe, the studs 88 carry blocks 94 which have curved contact faces for engagement with the band. A further support for the rear end of the band is provided by a backing member 98 (Fig. 8) shown as integral with the stud 82. To assist in pressing the band inwardly against the corners of the end of the shoe, arms 100 are pivotally mounted on the upper enlarged end of the stud 82 and have pivoted on their outer ends contact shoes 102 for engagement with the band. Integral also, in the construction shown, with the stud 82 are arms 104 in the ends of which are mounted spring plungers 106 which engage the arms 100 and through the shoes 102 maintain a constant pressure on the curved rear "corners" of the band sufficient to contract the band slightly in such manner that when a shoe is forced rearwardly into it an effective wiping and conforming pressure is applied round the corners of the end of the shoe. In order to limit adjustably the contraction of the band by the pressure of the shoes 102, the arms 100 in the present construction carry stop screws 108 for engagement with the member 98.

For closing the band and forcing it inwardly against the sides of the heel end portion of the shoe, the machine has lever arms 110 connected to the arms 92 to swing the latter inwardly. The connections between the arms 110 and 92 comprise adjustable links consisting of socket members 112 which are pivoted on the arms 110, and rods 114 pivoted on the arms 92 and extending within sleeve members 116 which are threaded in the socket members 112, the members 116 being confined on the rods 114 by means of nuts 118 keyed to the members 112. As thus constructed the connections provide for adjustment of the pressure applied by the band and adjustment for different sizes of shoes through turning movement of the sleeve members 116 to lengthen or shorten the distance between the arms 110 and 92.

Figure 2:
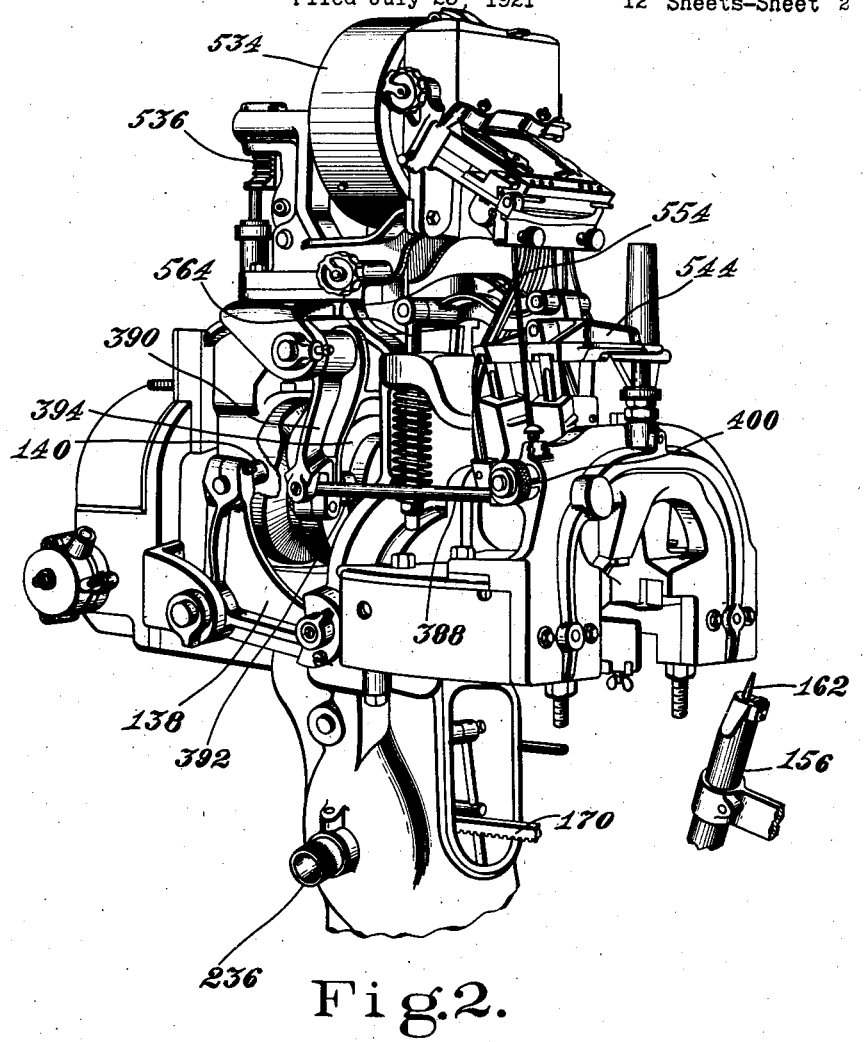
Fig. 2 is a perspective view of the head portion of the machine from a different viewpoint.

Operative movement of the arms 110 to close the band about a shoe is effected by means of a slide 120 which carries a T-shaped member having a head 122 in engagement with sliding rack bars 124 operatively connected to gear segments 126 on the arms 110. The shank 128 of the T-shaped member extends within the slide 120 and carries a spring 130 through which movement is imparted yieldingly to the band closing connections when the slide 120 is moved toward the right (Fig. 3). For imparting such movement to the slide the machine has a shaft 132 on which is formed a pinion 134 in engagement with rack teeth on the slide 120, the shaft having also a pinion 136 which is engaged and operated by a rack on a bell crank lever 138 (Fig. 2) provided with a roll 140 in engagement with a face cam 142 on the shaft 2. Return springs 144 which act on the slide 120 serve to hold the roll 140 in engagement with its cam and, when permitted by the cam, to swing the arms 110 and their connected mechanism outwardly to release the shoe.

The slide 84 which, as above explained, serves to support the rear end of the heel band, is an adjusting slide whereby the band may be moved bodily lengthwise of a shoe to determine the relation to the heel end face of the shoe of the wipers and the tacking devices, as may be necessary or desirable in changing from one size or style of shoe to another in order to vary the extent of overwiping movement of the wipers at the end of the shoe and the distance from the end of the shoe at which the tacks are driven. It will be understood that in such adjusting movement of the band its opposite side portions slide freely along the guideways provided by the clips 86. For effecting the adjusting movement of the slide 84, the machine has a pinion 146 which engages rack teeth on the slide and is integral with or fast on a shaft 148 provided on its outer end (Fig. 1) with an adjusting handle 150 having a pawl for engagement with ratchet teeth 152 to assist in holding the band in adjusted position. A further adjustment for different sizes of shoes, having in view the application of the forming pressure in substantially the same location on the sides of different shoes, is afforded by the slides 90 which carry the devices for supporting the sides of the band, these slides being adjustable lengthwise of the arms 92 which are provided with clamping bolts 154 to hold the slides in adjusted position.

As above explained, the rear supporting stud 82 for the heel band, and the studs 88 on which are mounted the supporting clips for the side portions of the band, are vertically movable in their different supporting members. The purpose and effect of this arrangement is to permit the band to be moved upward with the shoe when the latter receives its upward movement between successive overwiping operations, as will be more particularly set forth hereinafter.

For supporting the shoe there is provided a shoe support or jack comprising a standard 156 mounted in a casing 158 which is movable forwardly and rearwardly about a fixed horizontal pivot shaft 160, the standard 156 having thereon a heel pin 162 and a toe rest 164. It will be understood that after mounting the shoe on the jack and prior to the starting of the machine the operator, as in the use of prior machines, swings the jack rearwardly about the shaft 160 to carry the shoe into the heel band. Similarly also to the machine shown and described in the prior McFeely Patent No. 1,558,737, the present machine, generally speaking, has power means for operating the jack yieldingly to force the shoe backwardly into the band after the machine is started, and additional power means for forcing the shoe still further backwardly within the band simultaneously with the closing of the band about the end of the shoe. These movements of the jack are effected through the operation of a transverse shaft 166 which carries a pinion 168 engaging a rack bar 170 pivotally connected at its front end to the jack frame member 158. For turning the shaft 166 to impart to the jack its first rearward movement under power, the machine is provided with a lever 172 which is mounted on a fixed stud 174 (Fig. 5) and has at its upper end a roll 176 in engagement with a cam 178. At its lower end the lever 172 is connected to a pawl carrier 180 which is mounted to turn on the hub of a ratchet wheel 182 (Figs. 25 and 26), the ratchet wheel being keyed on one end of the shaft 166. The pawl carrier 180 is provided with pawls 184 dissimilarly arranged with respect to the corresponding teeth of the ratchet wheel 182, this arrangement of pawls being provided for the sake of greater precision without unnecessary lost motion. The pawls 184 are extended beyond the inner side of the ratchet wheel to co-operate with a throw-off plate 186 which is mounted on a boss on the frame of the machine and has diametrically opposite portions which project beyond the ratchet teeth, as shown in Fig. 26, and hold the pawls out of engagement with the ratchet wheel when the pawls are in starting position. This permits the shaft 166 to be turned reversely as the jack is swung forwardly to starting position. The throw-off plate 186 may be adjusted about its bearing on the frame to vary the extent of movement of the pawls before they arrive in position for effective engagement with the ratchet wheel and thus to vary the force applied by the lever 172 in moving the shoe rearwardly into the band. A clamping screw 188 which is threaded into the frame and extends through a slot in the throw-off plate serves to hold the plate in adjusted position.

The connections between the lever 172 and the pawl carrier 180 comprise a link 190 which is pivoted at one end to the pawl carrier and at its other end to the diametrically enlarged head portion 192 of a hollow rod 194. Within the rod 194 in the machine herein shown is a comparatively light spring 196 which bears at its front end on a plunger 198 and at its rear end on a screw 200 threaded within the end of the rod. The plunger 198 engages a pin 202 which is fast in lugs 204 on the lever 172 and extends through slots 206 in the rod 194. Encircling the rod 194 and slidingly mounted in a bearing in the lever 172 is a sleeve member 208 within which is mounted a bushing 210 having elongated slots registering with the slots 206 in the rod 194 and through which the pin 202 extends. Encircling the rod 194 is a comparatively heavy spring 212 which bears at one end on the bushing 210 and at its other end on a nut 214 threaded on the rod 194. The pin 202, in the position of the parts illustrated in Figs. 28 and 29, is in engagement with shoulders 216 in notched-out portions of the sleeve member 208. It will be evident that, as the parts are thus positioned, force is transmitted to the pawl carrier 180 through both the springs 196 and 212, since the pin 202 exerts a thrust against the sleeve member 208 as well as against the spring 196, and that a comparatively heavy resistance is thus afforded against relative movement between the lever 172 and the rod 194. In case it is desired on some work to apply less pressure to the jack in forcing the shoe yieldingly backward into the heel band, provision is afforded for rendering the heavy spring 212 inactive, at least until the greater part of the movement of the lever 172 has been completed. For this purpose the sleeve member 208 is arranged to be turned from the position indicated in Figs. 28 and 29 to a position in which diametrically opposite slots 218 in the member are in registry with the pin 202, the slots 218 being of sufficient length to render the spring 212 inactive to the extent required. Under these conditions the comparatively light spring 196 provides the only resistance to relative movement between the lever 172 and the rod 194 until the pin 202 arrives in position to engage the member 208 at the rear ends of the slots 218. In order to hold the member 208 in either of its positions of adjustment about the bushing 210, the member 208 carries a spring plunger 220 having a wedge shaped end for engagement with one or the other of two notches 222 in the bushing 210.

The subsequent power movement of the jack to force the shoe still more firmly into the heel band is a positive movement effected simultaneously with the closing of the band about the shoe through the operation hereinbefore described of the slide 120. For this purpose the slide 120 is provided with rack teeth in engagement with a gear segment formed on a bell-crank lever 224 (Fig. 3) which is connected by a link 226 to a pawl carrier 228 sleeved on the hub of a ratchet wheel 230 fast on the shaft 166 (Fig. 25), the carrier 228 being provided with a pawl 232 for operative engagement with the ratchet wheel. Adjacent to the ratchet wheel 230 is a throw-off plate 234 which operates similarly to the throw-off plate 186 to hold the pawl 232 from engagement with the ratchet wheel when the pawl carrier is in starting position, thus permitting return movement of the jack to carry the shoe forwardly out of the heel band. The throw-off plate 234 has a hub portion which is sleeved on the shaft 166 and which is slotted for engagement with teeth on an annular adjusting member 236 on the end of the shaft 166. By turning the member 236 the plate 234 may be turned to vary the time of engagement of the pawl with the ratchet teeth and thus to vary the extent of backward movement imparted to the jack by the operation of the pawl. The member 236 is held in adjusted position by means of a set screw 238. By reference to Fig. 30 it will be noted that, similarly to the machine shown in the prior McFeely Patent No. 1,558,737, the cam 142 is shaped to impart to the slide 120 two successive movements in the direction to close the heel band about the shoe and simultaneously to force the shoe backwardly into the band in time relation to other operative movements of the machine, as will be more particularly explained hereinafter.

To control the rack bar 170 and hold it in operative engagement with the pinion 168 a bracket 240 (Fig. 25) is provided in which is formed a slideway for the rack bar, this bracket being mounted in such manner as to permit it to turn slightly about the shaft 166 as required in the swinging movement of the jack. Mounted in a socket in the bracket 240 is a spring plunger 242 which is arranged to be engaged and forced backwardly by a lug 244 on the rack bar 170 in the latter portion of the backward movement of the jack. When the shaft 166 is released by the pawls 184 and 232 through the action of the throw-off plates, the spring plunger 242 serves to impel the jack forwardly and thus to relieve the operator of the necessity of swinging the jack to its starting position.

The shoe supporting standard 156 is mounted for vertical movement in the casing 158 and rests upon the upper end of a rod 246 the lower end of which is fast in a slide 248 having rack teeth in engagement with a pinion 250 rotatably mounted on the pivot shaft 160 (Fig. 16.). The slide 248 is movable along a guideway formed on a second slide 252 which is guided by the casing 158 and has its lower end portion shaped to underlie the lower end of the slide 248 in position to impart upward movement to the latter. As will be seen by reference to Fig. 16, the slide 252 at its upper end has an angular projection encircling the rod 246 and affording a bearing for the upper end of a spring 254, the lower end of which is supported by a lug on the casing 158, the upper end portion of the slide 252 also having a guiding screw 256 movable along a slot in the casing 158. When the parts are in starting position the slides 248 and 252 are at their lower limit of movement with the spring 254 under compression, as shown in Fig. 16, the slide 252 being held in this position by means of a pawl 258 which is mounted on the casing 158 and is held by a spring plunger 260 in engagement with ratchet teeth 262 on the slide. The pawl 258 is controlled by mechanism, more particularly described hereinafter, which is effective, at the end of the initial rearward swinging movement of the jack whereby the operator moves the shoe preliminarily into the heel band, to release the slide 252 to the action of the spring 254 which is thus rendered effective to move both the slides 252 and 248 upwardly and to force the shoe into engagement with a holddown member 264. The position of the parts after the shoe has thus been forced upwardly by the spring 254 is indicated in Fig. 17. In order to retard the upward movement of the shoe supporting standard and thus to avoid any objectionable shock in the movement of the shoe into engagement with the holddown, the machine is provided with a dash pot which may be constructed in any suitable manner and is herein shown as comprising an oil containing cylinder 266 within which is a plunger 268 for drawing oil from an outer chamber into an inner chamber in the cylinder, the plunger 268 being connected to one end of a lever 270 which is pivotally mounted on the frame 158 of the jack and is connected at its other end to the lower end of the slide 252. In order to accommodate the cylinder 266 to the movements of the lever 270 the cylinder is mounted to swing about a pivot 272 on the jack casing.

After the shoe has thus been forced upwardly against the holddown by the action of the spring 254, the shoe supporting standard 156 is operated upon in the course of the cycle of operations of the machine, first to position and hold the shoe more firmly in engagement with the holddown 264 to receive the operation of the wipers and subsequently to move the shoe farther upwardly as permitted by upward movement of the holddown and then to sustain the shoe with effective upward pressure for the final overwiping and tacking operations. Such control of the shoe supporting standard is effected through the slide 248 independently of the slide 252 through operating connections between the pinion 250 and the bell crank lever 224. By reference to Figs. 20, 21 and 22 it will be seen that mounted for turning movement about the shaft 160 is a clutch wheel 274 which is slotted on one side to receive fingers which project from the pinion 250 whereby the pinion is keyed to the clutch wheel. Sleeved on the hub portion of the clutch wheel 274 is a clutch dog carrier 276 which has pivoted thereon a clutch dog 278, the latter having opposed wedge shaped clutch fingers 280 and 282 (Fig. 22$^a$) arranged respectively for engagement with the inner and outer faces of a laterally projecting annular flange on the wheel 274. It will be understood that with the clutch dog 278 in one position the fingers 280 and 282 are operative to grip the wheel 274 and thus to transmit movement of the carrier 276 to the pinion 250, and that when the clutch dog is slightly displaced from operative position by turning it about its pivot 284 its clutch fingers are in position to release the wheel 274 and permit the latter to turn idly about the shaft 160. The clutch dog 278 is held in clutching position by means of a spring plunger 286 and is displaced from such position against the pressure of its spring plunger by means of a releasing member 288 which, as shown in Fig. 22, has a semi-cylindrical portion seated in a recess in the carrier 276 with its flat side directed toward the clutch dog in such manner that when it is turned from its neutral position it raises the clutch dog against the pressure of its spring plunger. Fast on the outer end of the member 288 is a controlling pawl 290 which is engaged by a spring 292 for turning the member 288 into position to permit the clutch dog to grip the clutch wheel 274. With the carrier 276 in its normal or starting position, as indicated in Figs. 17 and 20, the controlling pawl 290 is engaged and held by a throw-off plate 294 in such position as to tip the flattened portion of the member 288 and thus to hold the clutch dog in its neutral clutch releasing position. When operative movement is imparted to the carrier 276 the pawl 290 is carried out of engagement with the plate 294, permitting the spring 292 to turn the pawl in such manner as to cause the member 288 to release the clutch dog to the action of its spring plunger 286 which renders the dog effective to grip the clutch wheel 274. The plate 294 is adjustable about the shaft 160 to vary the time of release of the pawl 290 and thus to vary the extent of the movement of the pawl carrier which is effective on the shoe supporting standard. To permit adjustment of the plate, the hub portion of the latter is provided with slots (Fig. 21) to receive projecting fingers 296 on an adjacent sleeve 298 which is mounted to turn in the bearing of the machine frame wherein one end of the shaft 160 is supported. As shown in Fig. 18, the member 298 is split lengthwise to permit its expansion, and the end of the shaft 160 is also split and threaded to receive a conical screw 300 which spreads the end of the shaft and the sleeve to hold the latter in adjusted position.

Operative movements are imparted to the clutch dog carrier 276 from the bell-crank lever 224 when the latter is operated as hereinbefore described by movements of the slide 120. The connections between the carrier 276 and the bell-crank lever comprise separate links 302 and 304 connected respectively to the carrier and to the lever and yieldingly connected together at their adjacent ends. The connections between the two links comprise a cross head 306 fast on the link 302 and a cross head 308 fast on the link 304, and rods 310 which extend through both the cross heads and through springs 312 which are compressed between the cross head 308 and a plate 314 which underlies the upper headed ends of the rods 310. Threaded on the lower ends of the rods in abutting engagement with the cross head 306 are nuts 316 which are adjustable to vary the compression of the springs 312. It will be understood that with this construction upwardly directed force is applied to the shoe supporting standard 156 through the springs 312 which may yield, as indicated in Fig. 19, as the shoe is forced upwardly against the holddown or against the wipers, in order to avoid damage to the shoe through excessive pressure. The springs 312, however, are of sufficient strength to hold the shoe effectively against downward yield in response to the normal overwiping and compacting pressure of the wipers.

The mechanism for controlling the pawl 258, which, as hereinbefore explained, is operated in the initial rearward movement of the jack to release the slide 252 to the action of the spring 254, comprises a rod 318 which is pivoted to the pawl and extends rearwardly through an enlarged opening in a stop member 320 which is theaded in the frame of the machine. On its rear end the rod 318 carries a sleeve member 322 which projects loosely through the opening in the member 320 and has a flanged head 324 for engagement with the inner end of the stop member. Within the sleeve member 322 is a spring 326 which is held under compression between the sleeve member and a stop 328 on the end of the rod. Slidably and rotatably mounted on the rod 318 in front of the member 322 is a controlling member 330 (Fig. 24) which has a pair of fingers 332 arranged, when the parts are in the positions indicated in Figs. 16 and 17, to abut endwise against a stop member 334 which is fast on the rod 318. With the parts thus positioned, the head 324 of the member 322 is carried into engagement with the inner end of the stop member 320 when the jack is swung rearwardly by the operator and by pressure of the member 322 against the member 330 the rod 318 in the continued movement of the jack is caused to disengage the pawl 258 from the ratchet teeth 262 and thus to release the slide 252 to the action of the spring 254. Before the jack is swung forwardly again the pawl 258 is returned into position to cooperate with the ratchet teeth 262 in order to render it effective to hold the slide 252 which, as hereinafter explained, is returned by power to its initial position in the course of the cycle of operations. To cause the return of the pawl to its operative position the member 330 is turned about the rod 318 to bring its fingers 332 into registry with slots 336 at diametrically opposite sides of the stop member 334, whereupon the spring 326 acts to force the members 322 and 330 toward the left (Fig. 17) into the position indicated in Fig. 19, thus rendering the member 320 inoperative to hold the pawl in its idle position and permitting the spring plunger 260 to force the pawl into engagement with the ratchet teeth. For thus turning the member 330 the latter has sleeved thereon a member 338 provided with a lug 340 arranged to project within a slot 342 in the member 330 and to engage a shoulder 344 on said member to turn the latter until the fingers 332 enter the slots 336. To operate the member 338 it is connected by a link 346 to the cross head 308, and the parts are thus rendered effective to connect the pawl 258 with the ratchet teeth when upward movement is imparted to the shoe supporting standard by the bell-crank 224. Between one side of the finger 340 and the opposite end wall of the slot 342 is a spring 348 which acts normally to position the member 330 with its shoulder 344 in engagement with the finger 340 and which is compressed by reverse turning movement of the member 338 in the downward movement of the cross head 308 as the parts are returned to starting position. When thus compressed the spring 348 acts to turn the member 330 into position for the ends of its fingers 332 to abut against the stop member 334 upon such separating movement of the members 330 and 334 as to permit the fingers to be turned to this position. Such relative separating movement of the members 330 and 334 is effected by a spring 350 which is under compression betwen the members and acts to force the member 330 backwardly when the latter is relieved from the pressure of the spring 326. It will be understood that the spring 326 is stronger than the spring 350 and acts as above explained to force the fingers 332 into the slots 336 notwithstanding the interposition of the spring 350. In order to relieve the member 330 from the pressure of the spring 326 and thus permit it to be returned by the spring 350, a collar 351 is secured on the outer end of the member 322 in position to abut against the stop 320 as the jack is swung forwardly to its starting position and thus to limit the forward movement of the member 322 while the rod 318 continues its movement against the pressure of the spring 326 for a sufficient distance to permit the fingers 332 to be withdrawn from the slots 336 and turned into position to abut against the member 334.

The desired movement of the slide 252 to put the spring 254 again under compression in preparation for operation of the machine on the next shoe is effected by the operative movement of the bell crank lever 224 as the shoe supporting standard is forced upwardly as above described. For this purpose a link 352 is connected at its lower end to the lever 270 and at its upper end is slotted to embrace a pin 354 on the bell-crank lever. By reference to Fig. 17 it will be noted that the pin 354 is near the upper end of the slot in the link 352 but is spaced therefrom sufficiently to permit such movement of the links 302 and 304 as to cause the clutch dog 278 to grip the clutch wheel 274 before the link 352 begins to move to force the slide 252 downwardly. This insures that the slide 248 will not move downwardly with the slide 252. By the time when the lever 224 has arrived at the limit of its operative movements, as indicated in Fig. 19, the slide 252 is again in its lowermost position where it is held by its pawl and ratchet mechanism. Subsequently, as will be understood, the slide 248 is released and returned to its lowermost position where it is supported at its lower end by the slide 252.

Sometimes, after having swung the jack rearwardly and caused the release of the slide 252 to force the shoe upwardly against the holddown, the operator may desire again to swing the jack forwardly and to rearrange the work before the machine operates upon it. In order to permit this to be done, the jack casing 158 has pivoted thereon a hand lever 356, and mounted on the same pivot independently of the lever is a pinion 358 in engagement with annular rack teeth 360 on the standard 156. Movable lengthwise within the lever 356 is a pin 362 which at its inner end is arranged to engage between adjacent teeth of the pinion and at its outer end is fast on a handle 364 slidably mounted on the lever. A spring 366 within the handle 364 normally holds the pin out of engagement with the pinion 358, permitting the latter to be turned idly in the movements of the standard 156 for jacking the shoe. When it is desired to withdraw the shoe prior to the starting of the power operation of the machine, the handle 364 is pressed inwardly to engage the pin 362 with the pinion 358 and by swinging the lever 356 the pinion may then be turned to depress the standard 156 sufficiently to release the shoe from engagement with the holddown and permit the jack to be swung forwardly to its initial position. When a shoe is thus withdrawn manually it is desirable again to force the slide 252 downwardly against the pressure of the spring 254 in order that the spring may again act to force the shoe upwardly in the next rearward movement of the jack. For this purpose the lever 270 has pivoted thereon an arm 368 which extends forwardly and is slotted at its front end to embrace a pin 370 fast on the frame of the machine. It will be evident by reference to Fig. 17 that in case the jack is swung forwardly with the shoe after the slide 252 has been lifted by the spring 254, the arm 368 by its engagement with the pin 370 will be rendered effective to turn the lever 270 and its connected parts to move the slide 252 downwardly and compress the spring 254, as indicated in Fig. 17ª, the pawl 258, of course, being positioned to hold the slide against return forward movement.

As hereinbefore stated, the standard 156 is supported on the upper end of the rod 246. In order to permit adjustments of the height of the heel pin 162, as may be desired in changing from one style or size of shoe to another, the lower end of the standard 156 is recessed to receive a thimble 372 which is supported on the upper end of the rod 246 and is provided with a plurality of pairs of diametrically opposite slots 374 of different lengths to receive and support downwardly projecting fingers 376 on the end of the standard 156. It will be evident that by positioning the fingers 376 in one or another of the different pairs of slots the standard may be positioned at different heights relatively to the rod 246. In order to provide an additional and more delicate adjustment of the height of the standard, a screw 378 is threaded within the thimble 372 to engage the upper end of the rod 246. It will be understood that the standard 156 may be withdrawn from its guideway in the jack casing at any time to permit adjustment of the screw 378 by the aid of a screw driver.

Figure 9:
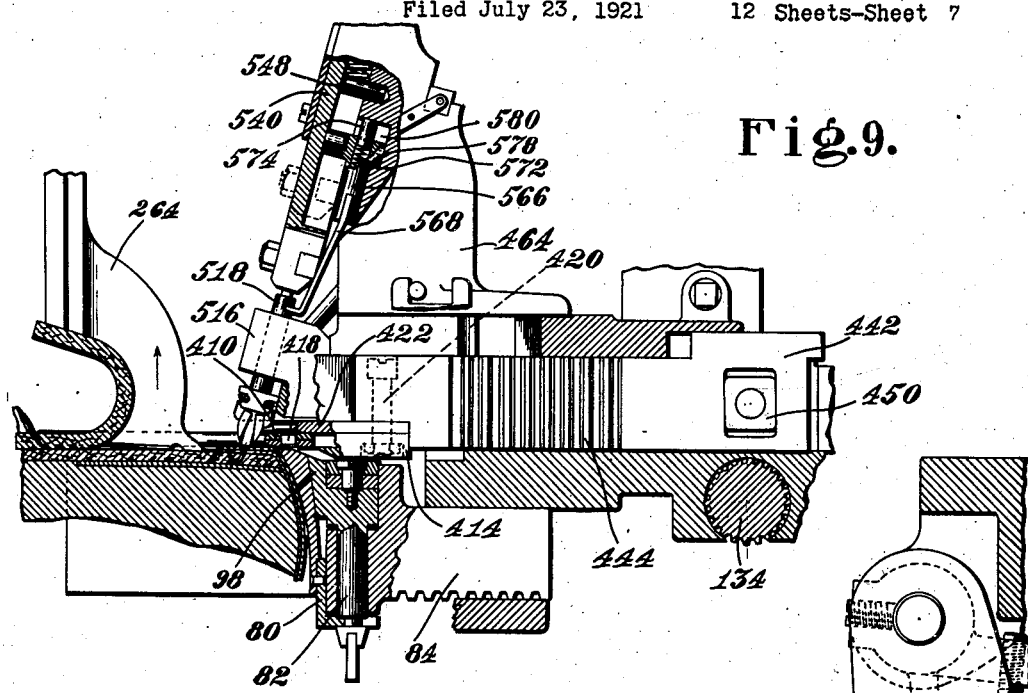
Fig. 9 is a view partly in side elevation and partly in vertical section in the same plane as Fig. 8, illustrating the tack driving operation with the wipers partially closed over the heel seat.

The holddown 264, which is arranged to engage the shoe on the heel seat and in cooperation with the jack to determine the height of the heel seat, is mounted for vertical movement in a slideway in the frame and is provided with rack teeth in engagement with a pinion 380 formed on a horizontal shaft 382. To impart vertical movement to the holddown the machine has a rack bar 384 in operative engagement with a spiral gear 386 on the shaft 382, the rack bar being pivotally connected to a link 388 (Figs. 2 and 8) which is connected to a lever 390 provided with a roll 392 in engagement with a face cam 394. Between the front end of the rack bar 384 and the frame is a spring 396 which presses the rack bar rearwardly and holds the roll 392 in engagement with its cam. It will be understood that when the rack bar is moved forwardly by the cam it imparts to the holddown 264 a downward movement and that the upward movement of the holddown is effected by the spring 396 as permitted by the cam. The spiral gear connection between the rack bar and the shaft 382 is provided in the machine herein shown for the purpose of adjusting the holddown upwardly or downwardly. Such adjustment is effected by lengthwise movement of the shaft 382, whereby the rack bar 384 acts on the spiral gear 386 to turn the shaft and thus to vary the initial height of the holddown. For imparting to the shaft 382 such lengthwise movement there is mounted rotatably on the outer end of the shaft, between the end of the spiral gear 286 and a fixed collar 398, a screw 400 which is threaded within a recess in the frame. To fix the parts in adjusted position the screw 400 is provided with a plurality of peripheral slots 402, and a correspondingly shaped lower end of a spring plunger 404 is arranged to enter one or another of these slots to hold the screw from turning. By means of a knob 406 the operator may withdraw the member 404 from the slot in which it is seated, thus releasing the screw for turning movement. In order to vary the extent of movement imparted to the holddown by its cam, the lever 390 carries an adjustable stop screw 408 for engagement with a portion of the frame to hold the roll 392 initially more or less away from the cam. By reference to Figs. 8 and 9 it will be seen that the hold-down 264 is shaped to serve additionally as means for holding the heel end of the sole of a turn shoe in an upwardly or backwardly turned position away from the heel seat when the machine is operating on shoes of that kind.

For wiping the margin of the upper over the heel seat the machine has a pair of wiper plates 410 carried by a slide 412 which is mounted for movement lengthwise of the shoe in a guideway in the frame. To support the wiper plates the slide 412 has secured thereto a plate 414 which has an upstanding curved rib 416 extending into a groove in the wiper plates to guide them in their swinging movements, the plates being pivoted together by means of a pin 418 located at the axis of the curve of the guiding rib. Overlying the wiper plates and secured to the slide 412 by bolts 420 which also hold the plate 414 in place is a thrust plate 422 which, as shown in Fig. 6, is curved similarly to the wipers and is extended forwardly for a considerable distance on each side to sustain the upward thrust of the wipers in their operative movement over the shoe. At its rear end the wiper slide 412 is recessed to receive the forwardly projecting portion of a rear slide 424, the two slides being held in fixed relation by means of a transverse shaft 426. The rear slide 424 carries a roll 428 which projects within a cam groove 430 and is operated by the cam to impart bodily advancing movement to the wiper plates.

Operative closing movement is imparted to the wiper plates 410 simultaneously with their advancing movement by means of slides 432 (Figs. 5 and 10) to the inner ends of which are secured underlying wiper supporting plates 434 and overlying thrust plates 436, the plates 434 having slots 438 (Fig. 6) to receive pins or rolls 440 on the wipers and thus to guide the wipers in their movement lengthwise of the shoe. For imparting operative movement to the lateral wiper slides 432, the slide 412 is recessed to receive an additional slide 442 (Fig. 9) which is held in predetermined relation to the slide 412 by means of the transverse shaft 426 and is provided with forwardly extending rack bars 444. Pivotally mounted in the frame are bell-crank levers 446 provided on their opposite ends with gear segments for engagement respectively with the rack bars 444 and with pinions 448, the latter being operatively engaged with rack teeth on the sides of the slides 432. It will be evident that with this construction and arrangement the lateral slides 432 are moved inwardly simultaneously with the forward movement of the rear wiper slide 412. In order to vary the limit of inward movement of the wipers laterally of the shoe, as may be required for different sizes or styles of shoes, the machine is provided with means for adjusting the rack slide 442 relatively to the slide 412, thus moving the lateral wiper slides 432 inwardly or outwardly without affecting the position of the slide 412. For this purpose the transverse shaft 426 has on its opposite ends eccentric portions mounted in slide blocks 450 which are movable vertically in recesses in the opposite side portions of the slide 442. For turning the shaft 426 to adjust the slide 442 a shaft 452 is rotatably mounted in the stud 174 hereinbefore described, the shaft having on its inner end a head provided with a transverse slot 454 to receive a projection 456 on the end of the shaft 426. On the outer end of the shaft 452 is a hand wheel 458, and in engagement with this wheel is a spring 460 which holds the shaft 452 normally at its outer limit of movement as indicated in Fig. 5. By pressing the hand wheel 458 and the shaft 452 inwardly and by turning them slightly as may be required in order to permit the projection 456 to enter the slot 454, and by then turning the hand wheel one way or the other, the slide 442 may be adjusted as required. In order to retain the slide 442 in adjusted position, the rear slide 424 carries a spring pressed pawl 462 arranged to engage one or another of a series of notches formed in the shaft 426. It will be understood that in addition to adjusting the wipers laterally of the shoe a corresponding relative adjustment between the shoe and the wipers lengthwise of the shoe may be effected by movement of the heel band supporting slide 84 as hereinbefore described.

For securing the margin of the upper in lasted position on the heel seat the machine is provided with means for driving a plurality of tacks at approximately equal distances apart around the end and along the sides of the heel seat. The construction shown comprises a rear or end tacker mechanism (Fig. 5) arranged to drive two tacks at the rear end of the shoe, two corner tacker mechanisms arranged to drive three tacks round each corner of the heel seat, and two front or side tacker mechanisms each arranged to drive a single tack farther forwardly at the side of the heel seat. It will be understood, however, that the number and arrangement of the tacks may be varied as desired. The end tacker mechanism comprises a tacker slide 464 which is mounted on the top of the wiper slide 412 with portions extending respectively below and above a cover plate 466 which overlies the several wiper slides 412 and 432. The tacker slide 464 is moved forwardly and rearwardly by the action of the wiper slide 412 through a yielding connection between the two slides. For this purpose the slide 412 is slotted lengthwise to receive a connecting slide 468 which has an upstanding projection extending within a recess in the slide 464. Within a recess in the slide 468 is a spring 470 which bears at its opposite ends on plungers 472 arranged for engagement with blocks 474 which are fast on the slide 412, the slide 468 having slots within which the blocks 474 extend. It will be evident that, as the parts are thus constructed, the spring 470 maintains the tacker slide normally in determinate relation to the wiper slide and permits the wiper slide to move forwardly relatively to the tacker slide when the latter is stopped by resistance encountered in its forward movement. By reference to Figs. 8 and 9 it will be seen that the tacker slide 464 carries a pin 476 which is arranged to co-operate with a stop block 478 on the cover plate 466 to limit the forward movement of the rear tacker mechanism. It will be evident from Fig. 8 that when the movement of the tacker slide is thus stopped the continued movement of the slide 412 effects a compression of the spring 470 by the action of the rear block 474 on the adjacent plunger 472. An object of this arrangement is to prevent the rear tacker mechanism from being moved so far inwardly over the heal seat as to interfere with other tacker mechanisms in the first two advancing movements of the wipers which are of considerably greater extent than the final movement immediately prior to the driving of the tacks. The stop mechanism serves additionally to determine the distance from the rear end of the heel seat at which the rearmost tacks are driven.

Each of the front or side tacker mechanisms comprises a tacker slide 480 on the top of the wiper operating slide 432 and positioned in substantially the same relation to the wiper slide and the cover plate as the end tacker slide 464. Each tacker slide 480 is moved inwardly by the wiper slide 432 through a yielding connection substantially like the connection between the rear tacker slide and its associated wiper slide, comprising a spring 482 mounted in a recess in a connecting slide 484 and bearing oppositely against a pin 486 in the slide 432 and an upstanding projection on the rear end of the slide 432. Each of the slides 480 has at its outer end a downwardly extending projection provided with a pin 488 which projects into a slot 490 in the frame of the machine, whereby inward movement of the tacker mechanism is limited to avoid interference with other parts of the machine as the wipers move inwardly over the shoe in the first two overwiping operations. The slot 490, however, as distinguished from the limiting means associated with the end tacker mechanism, is extended inwardly so far that ordinarily in the operation of the machine the final inward movement of each side tacker mechanism, whereby it is positioned for the tack driving operation, will not be positively limited by the pin and slot connection, this construction permitting an adjustment of each side tacker mechanism to vary the distance from the edge of the heel seat at which the tacks are driven. For the purpose of such adjustment the spring controlled slide 484 is projected upwardly within a slot in the tacker slide 480 and is connected to the latter by means of an adjusting screw 492 which is threaded in the tacker slide and has its head seated between lugs on the slide 484. The outer end of this screw is slotted to receive a screw driver which may be inserted through an opening 494 in the frame. In order to hold the screw 492 from turning too freely, it is engaged on one side by means of a set screw 496. It will be evident that by turning the screw 492 the tacker slide 480 will be adjusted inwardly or outwardly relatively to the wiper slide 432.

Each of the corner tacker mechanisms comprises a tacker slide 498 (Figs. 5 and 11) which extends below and above the cover plate 466 along a guideway in the frame and is moved inwardly and outwardly with the other tacker slides by means of a pinion 500 which is operated by the pinion 448 and imparts lengthwise movement to a rack bar 502. Between the rack bar 502 and the slide 498 is a yielding connection similar to the yielding connection provided between each tacker slide 480 and its wiper slide 432. This connection comprises a spring 504 positioned within a recess in a connecting slide 506 between which and the rack bar 502 there is provision for relative lengthwise movement, the rack bar having pins for engagement with opposite ends of the spring. The connecting slide 506 is held adjustably in fixed relation to the tacker slide 498 by means of a screw 508, the head of which is mounted between opposed lugs on the slide 506 and which is arranged to be turned by a screw driver through an opening 510 in the frame. Adjustment of each corner tacker mechanism may thus be effected similarly to the adjustment of each side tacker mechanism to determine the distance of the tacks from the edge of the heel seat.

Similarly to the side tacker mechanisms, inward movements of the corner tacker mechanisms in the first two overwiping operations are limited by means comprising a pin 512 on the tacker slide and a slot 514 in the frame, the slots being sufficiently elongated to permit the tacks to be spaced inwardly over the heel seat as may be desired by adjustment of the screw 508.

Detachably secured on each of the several tacker slides is a tack block 516, the lower faces of these tack blocks being spaced slightly above the thrust plates 422 and 436 which overlie the wipers in order to relieve the tack blocks from upward pressure of the wipers such as might tend to subject the tackers to undue bending strain. In each of the tack blocks 516, in accordance with the number of tacks which are to be driven, there are formed one or more slideways for tack holders or throats 518, the construction of which is shown in detail in Figs. 13 and 14. Each tack holder comprises a tube mounted for lengthwise movement in the corresponding slideway in the tack block and bored centrally to receive a corresponding tack driver 520. At its lower end the tack holder is shouldered for limiting engagement with the lower face of the tack block and is provided with a pair of tack fingers 522 which have complemental tack receiving recesses and are provided with cylindrical bearing portions 524 mounted to turn in corresponding transverse bearings in the lower end portion of the tack holder. By reference to Fig. 14 it will be seen that as the tack fingers are thus mounted they are guided between lugs 526 on the tack holder. To hold the tack fingers normally in closed relation springs 528 are provided, the opposite ends of the springs being seated in recesses formed respectively in the tack fingers and in the tack holder member 518. Each of the tack holders 518 is provided with a slot 530 through which the tacks are fed from tack tubes having upper flexible portions 532 which lead downwardly from a tack separator. The means for separating the tacks and for delivering them into the tack tubes at the proper time is not illustrated in detail, since this means may comprise a construction such as commonly provided heretofore for a similar purpose, as illustrated for example in Patent No. 1,129,882, granted on March 15, 1915, upon an application of R. F. McFeely. It will be understood that the tacks are separated and delivered through oscillatory movements of a tack hopper 534 derived from reciprocatory movements of a rack bar 536 operated yieldingly by a cam slide 538.

The driver or drivers 520 of each tacker mechanism are carried by a driver bar 540 movable in a guideway in the corresponding tacker slide and carrying at its upper end a bearing block 542 having a tongue and groove connection with a driver head 544, the tongue and groove connections permitting the different tacker mechanisms to be moved inwardly and outwardly as hereinbefore explained. A spring 546 mounted in a recess in the driver bar and engaging at its lower end a pin 548 which is fast in the tacker slide assists in imparting return upward movement to the driver bar and by holding the bearing block firmly up against the driver head acts to eliminate any possible lost motion and resulting noise which there might be due to wear. The driver head 544 is guided on a rod 550 and is connected by a link 552 to an operating lever 554, the latter being connected to the frame at its rear end by a link 556 and having an intermediate connection with a plunger 558 controlled by a cam 560 on the shaft 2. For imparting downward operative movement to the driver head 544 the machine has springs 562 which bear downwardly on links 564 connected at their upper ends to the lever 554. It will be understood that when the cam 560 releases the driver head it is impelled downwardly by the springs 562 to operate the several tack drivers, and that subsequently the head and the drivers are lifted by the operation of the cam.

The tack holders 518 are held initially with their tack fingers high enough to be clear of the wipers in the first two overwiping operations. It is desirable, however, that in the tack driving operation the tack fingers be positioned close to the work in order that the tacks may be effectively controlled with respect to the direction in which they are driven until they have been forced into the work. The machine shown accordingly is provided with mechanism for imparting downward movement to the several tack holders prior to the driving of the tacks in order to carry the tack fingers into close proximity to the heel seat and it may be into engagement with the shoe. By reference to Figs. 9 and 10 it will be seen that there is mounted in each tacker slide a controlling slide 566 which has a downwardly projecting plate 568 with an angled end portion arranged to extend within slots 570 in the several tack holders 518 with which the respective mechanism is provided. The slide 566 is pressed downwardly by means of a spring 572 and a plunger 574 which are seated within a socket in the slide and bear upwardly against the wall of the recess in the tacker slide in which the member 566 is mounted. In order to hold the slide 566 and the associated tack holders 518 initially in an upraised position, the slide 566 is provided with a lug 576 which projects within a slot in the rear of the driver bar 540 and is engaged by a shoulder on the driver bar to sustain the tack holders in their uppermost position. When the driver bar 540 receives its operative driving movement the spring 572 acts to force the slide 566 and the tack holders 518 downwardly, as will be evident by reference to Fig. 9, the limit of such downward movement being determined by the engagement of a rear lug 578 on the slide 566 with the lower end wall of a slot 580 in the tacker slide. This construction makes it feasible to use shorter tacks than would be required if the tack fingers were not so close to the shoe in the tack driving operation. Novel features of this tacker mechanism are claimed in a divisional application Serial No. 601,594, filed on November 17, 1922.

In the operation of the machine, briefly summarized, the operator mounts a shoe on the jack and after making any preliminary adjustments that may be necessary in the manner hereinbefore explained, swings the jack rearwardly to carry the shoe into the heel band. Near the end of this rearward movement of the jack the spring operated slide 252 is released by the pawl 258 and in its upward movement carries the slide 248 along with it, thus raising the shoe into engagement with the holddown 264. If the operator should now desire to remove the shoe for the purpose of better adjustment or for any other reason, he lowers the standard 156 by the operation of the lever 356 and swings the jack forwardly again. In such forward movement of the jack the slide 252 is moved downwardly to compress its spring 254 through the action of the member 368, and the pawl 258 holds the slide ready to perform its jacking operation again in the next rearward movement of the jack.

After the shoe has been forced upward yieldingly against the holddown by the action of the jack spring 254, the operator pushes forward the starting member 54 and starts the machine. By reference to Fig. 30 it will be seen that upon the starting of the machine the cam 178 becomes effective to impart through the lever 172 and yielding connections, illustrated in Fig. 28, a further rearward movement to the jack to force the shoe farther backwardly into the heel band and to effect by the action of the spring plungers 106 at the corners of the band a forward wiping of the upper at the sides of the heel end of the last. As the shoe is thus forced rearwardly into the heel band, the cam 394 is effective on the holddown operating mechanism to impart to the holddown and the shoe a downward movement in order to position the heel seat in the desired plane relatively to the wipers for the initial overwiping operation. By such downward movement of the shoe the heel band is rendered effective to wipe the upper upwardly toward the heel seat round the rear end of the shoe.

Substantially at the end of the downward movement of the holddown and the yieldingly effected rearward movement of the jack the cam 142 becomes effective on the roll 140 to impart to the slide 120 a rearward movement, whereby the heel band is closed yieldingly inward against the sides of the shoe, the jack is positively operated to force the shoe still more firmly backward into the heel band, and the jack slide 248 is operated yieldingly through the springs 312 to force the shoe more firmly upward against the holddown, such upward movement of the jack slide occurring simultaneously with a return downward movement of its associated slide 252 approximately to its initial locked position.

Substantially at the end of the first operative movement of the slide 120, a point indicated at $a$ on the cam 142 (Fig. 30), the wiper cam 430 becomes effective to impart to the wipers their first overwiping movement over the heel seat, the wipers being forced inwardly to positions substantially as indicated by the inner broken lines on Fig. 5. Following this inward movement of the wipers they are retracted again substantially to their initial open position. Substantially at the time when they have thus arrived at open position a rise on the cam 142, indicated at $b$ (Fig. 30), becomes effective to impart to the slide 120 a further rearward movement, thus closing the heel band still more firmly round the shoe, forcing the shoe more firmly backward into the band, and imparting a further lifting movement to the rod 304 to subject the jack slide 248 to upward pressure through the springs 312. Substantially simultaneously with such additional movement of the slide 120, a depression in the holddown cam 394, indicated at $c$ (Fig. 30), permits upward movement of the holddown, causing the shoe to be lifted by the jack springs 312 to position the heel seat at a slightly higher level for the next overwiping operation. In such upward movement of the shoe the heel band is also carried upwardly by reason of the manner in which it is mounted on its supports. The wiper cam then imparts to the wipers another overwiping movement to substantially the same limit as before, returns them outwardly again to open position, and then moves them inwardly for a portion only of the distance covered in each of the first two overwiping operations. At this point the cam 560 trips off the tack driving mechanism and the tacks are driven in the manner indicated for example in Fig. 9. Following the tack driving operation the parts of the machine are returned to their starting positions, the jack being impelled forwardly by the action of the spring plunger 242, and the tacks being fed into the tack holders in preparation for the operation of the machine on the next shoe.

Having described my invention, what I claim as new and desire to secure by Letters Patent of the United States is:

1. In a machine of the class described, the combination with shoe positioning means, of means for wiping the margin of the upper into lasted position about an end of the shoe, a plurality of tackers at each side of the end of the shoe mounted independently of one another for inward movements into position for fastening the margin of the upper, and a common operating mechanism connected to the different tackers at each side of the shoe to move them inwardly together.

2. In a heel seat lasting machine, the combination with a shoe support, of end embracing wipers for wiping the margin of the upper into lasted position about the heel end of the shoe, side and corner tackers mounted for movements inwardly at each side of the heel end of the shoe in converging paths, a power shaft, and connections between said power shaft and the side and corner tackers for moving said tackers inwardly together.

3. In a heel seat lasting machine, the combination with a shoe support, of means for wiping the margin of the upper inwardly about the heel end of the shoe, a plurality of tackers at each side of the heel end of the shoe mounted independently of one another for inward movements into position for fastening the margin of the upper, a rack bar associated with each tacker for moving it inwardly, and gearing mechanism connected to the several rack bars for moving the tackers inwardly together.

4. In a machine of the class described, the combination with shoe positioning means, of means for wiping the margin of the upper inwardly about an end of the shoe, end, side and corner tackers mounted for inward movements into position for fastening the margin of the upper, and means for moving said tackers inwardly comprising a rack and pinion mechanism associated with each of said side tackers and corner tackers for imparting inward movements to said tackers.

5. In a machine of the class described, the combination with shoe positioning means, of end embracing wipers for wiping the margin of the upper into lasted position about an end of the shoe, operating mechanism for moving said wipers inwardly, end and side tackers arranged to be moved inwardly by said wiper operating mechanism into positions for fastening the margin of the upper, additional corner tackers independently mounted to move inwardly between the end and side tackers, and connections between the wiper operating mechanism and said corner tackers for imparting inward movements to the corner tackers with the end and side tackers.

6. In a machine of the class described, the combination with shoe positioning means, of wipers for wiping the margin of the upper inwardly about an end of the shoe, operating slides movable respectively lengthwise and laterally of the shoe for advancing and closing said wipers, means for imparting inward movements to said slides comprising rack and pinion mechanisms for moving inwardly the slides at the sides of the shoe, end and side tackers arranged to be moved inwardly by said slides, corner tackers mounted for inward movements between the end and side tackers, and additional rack and pinion mechanisms for moving said corner tackers inwardly with the wipers.

7. In a heel seat lasting machine, the combination with shoe positioning means, of means for wiping the margin of the upper inwardly over the heel seat, tackers movable laterally of the shoe into tacking position over the heel seat, members movable laterally of the shoe to position said tackers, and yielding elements between said members and the tackers to permit the tackers to yield in response to resistance to their inward movements.

8. In a heel seat lasting machine, the combination with shoe positioning means, of means for wiping the margin of the upper inwardly over the heel seat, a plurality of tackers at each side of the shoe mounted independently of one another to move inwardly over the heel seat, and a common operating mechanism connected to the several tackers to move them inwardly and constructed to permit the different tackers to yield independently of one another in response to resistance to their inward movements.

9. In a machine of the class described, the combination with shoe positioning means, of means for wiping the margin of the upper inwardly about an end of the shoe, side and corner tackers movable inwardly in converging paths at each side of the end of the shoe, and a rack and pinion mechanism associated with each of said tackers for moving it inwardly and including spring means arranged to permit the tacker to yield in response to resistance to its inward movement.

10. In a machine of the class described, the combination with shoe positioning means, of end embracing wipers for wiping the margin of the upper into lasted position about an end of the shoe, a plurality of tackers at each side of the end of the shoe mounted independently of one another for inward movements into position for fastening the margin of the upper, and operating mechanism for moving said tackers and wipers inwardly together including yielding elements arranged to permit the tackers to yield relatively to the wipers while the wipers continue their inward movement.

11. In a machine of the class described, the combination with shoe positioning means, of end embracing wipers for wiping the margin of the upper inwardly about an end of the shoe, a power shaft, operating mechanism between said power shaft and the wipers for moving the wipers inwardly, tackers mounted for movements laterally of the shoe into position for fastening the margin of the upper, and connections between said wiper operating mechanism and the tackers for moving the tackers inwardly by said mechanism comprising spring means arranged to permit the tackers to yield relatively to the wipers while the wipers continue their inward movement.

12. In a machine of the class described, the combination with shoe positioning means, of wipers for wiping the margin of the upper inwardly about an end of the shoe, wiper operating means comprising operating slides movable laterally of the shoe, tackers movable laterally of the shoe into position for fastening the margin of the upper, and yielding connections between said slides and the tackers for moving said tackers inwardly by the movement of the slides, said connections being constructed to permit the tackers to yield relatively to the wipers while the wipers continue their inward movement.

13. In a machine of the class described, the combination with shoe positioning means, of end embracing wipers for wiping the margin of the upper inwardly about an end of the shoe, operating means for closing the wipers over the shoe, a plurality of tackers at each side of the end of the shoe mounted independently of each other for inward movements laterally of the shoe with the wipers, yieldable means for moving the tackers inwardly with the wipers, and means for limiting the inward movements of the tackers without affecting the limit of movement of the wipers.

14. In a machine of the class described, the combination with shoe positioning means, of end embracing wipers for wiping the margin of the upper inwardly about an end of the shoe, operating means for said wipers comprising members movable laterally of the shoe to close the wipers inwardly, tackers also mounted for movements laterally of the shoe, yielding connections between said members and the tackers for moving the tackers inwardly, and means for limiting the inward movements of the tackers without affecting the limit of movement of the wipers.

15. In a machine of the class described, the combination with shoe positioning means, of end embracing wipers for wiping the margin of the upper inwardly about an end of the shoe, operating means for said wipers, side and corner tackers mounted for movements inwardly at each side of the shoe in converging paths, connections between the wiper operating means and said tackers to move the tackers inwardly, and a stop mechanism associated with each tacker to limit its inward movement without affecting the limit of movement of the wipers.

16. In a machine of the class described, the combination with shoe positioning means, of end embracing wipers for wiping the margin of the upper inwardly about an end of the shoe, operating means for said wipers, a plurality of tackers at each side of the end of the shoe mounted independently of one another for inward movements laterally of the shoe, means for moving said tackers yieldingly inward with the wipers, and a stop mechanism associated with each tacker to limit its inward movement and adjustable to vary its limit of movement.

17. In a machine of the class described, the combination with shoe positioning means, of end embracing wipers for wiping the margin of the upper inwardly about an end of the shoe, a plurality of tackers at each side of the end of the shoe movable inwardly in converging paths, operating means for moving said wipers and tackers inwardly over the shoe together, and means for stopping the inward movements of the tackers while the wipers continue their movement to overwipe the margin of the upper beyond the locations where the tacks are to be driven.

18. In a machine of the class described, the combination with shoe positioning means, of end embracing wipers for wiping the margin of the upper inwardly about an end of the shoe, operating means for closing said wipers inwardly over the shoe, a plurality of tackers for each side of the end of the shoe, said tackers being mounted independently of one another for movements inwardly with the wipers, and means for positioning said tackers yieldingly for the tack driving operation in locations determined by the position of the wipers.

19. In a machine of the class described, the combination with shoe positioning means, of end embracing wipers for wiping the margin of the upper inwardly about an end of the shoe, operating means for closing said wipers inwardly over the shoe, a plurality of tackers movable inwardly over the shoe, and yielding connections between said tackers and the wiper operating means for moving said tackers inwardly by said means and for determining the location of the tackers for the tack driving operation by the position of the wipers.

20. In a machine of the class described, the combination with shoe positioning means, of end embracing wipers for wiping the margin of the upper inwardly about an end of the shoe, side and corner tackers movable inwardly at each side of the end of the shoe, means for limiting the inward movements of said tackers, and operating means for said wipers and tackers constructed to continue the inward movement of the wipers after the tackers have arrived at their limit of movement and subsequently to position the wipers and tackers for the tacking operation in locations where said limiting means is inoperative to determine the position of the tackers.

21. In a machine of the class described, the combination with shoe positioning means, of end embracing wipers for wiping the margin of the upper inwardly about an end of the shoe, operating means for moving said wipers inwardly a predetermined distance and for subsequently moving them inwardly a lesser distance to position them for the fastening of the upper, a plurality of tackers movable inwardly into positions for fastening the margin of the upper, operating connections between the wiper operating means and the tackers for moving the tackers yieldingly inward with the wipers, and mechanism for stopping the inward movement of the tackers before the wipers arrive at the limit of their greater movement over the shoe, said stop mechanism being arranged to leave the tackers under control of said yielding connections to be positioned in locations determined by the position of the wipers when the wipers are at the limit of their shorter movement over the shoe.

22. In a heel seat lasting machine, the combination with shoe positioning means, of end embracing wipers mounted for advancing and closing movements inwardly over the heel seat, operating means for moving said wipers inwardly different distances in different overwiping operations on a shoe, end, side and corner tackers movable inwardly over the heel seat, means for moving said tackers yieldingly inward with the wipers, and limiting means for stopping the inward movements of the several tackers before the wipers arrive at the limit of their greater movement over the shoe.

23. In a machine of the class described, the combination with shoe positioning means, of a wiper for wiping the margin of the upper inwardly over the shoe, a member movable inwardly toward the shoe to operate the wiper, a tacker also movable inwardly over the shoe, a yielding connection between said member and the tacker for moving the tacker inwardly by the movement of said member, and means for adjusting the tacker inwardly or outwardly relatively to said member and the wiper.

24. In a machine of the class described, the combination with shoe positioning means, of a wiper for wiping the margin of the upper inwardly over the shoe, a wiper operating slide, a tacker also movable inwardly over the shoe, a yielding connection between said slide and the tacker for moving the tacker inwardly, a device for limiting the inward movement of the tacker independently of the wiper, and additional means for adjusting the tacker inwardly or outwardly with relation to the wiper.

25. In a machine of the class described, the combination with shoe positioning means, of a wiper and a tacker mounted for inward and outward movements relatively to the shoe, an operating member for moving said wiper and tacker inwardly and outwardly, and an oppositely acting spring connection between said member and the tacker arranged to permit by its yield relative inward and outward movements between the wiper and the tacker.

26. In a machine of the class described, the combination with shoe positioning means, of a wiper and a tacker mounted for inward and outward movements relatively to the shoe, a wiper operating slide, and a spring between said slide and the tacker to cause the slide to move the tacker yieldingly inward with the wiper, the tacker being also movable inward relatively to the wiper against the resistance of said spring.

27. In a machine of the class described, the combination with shoe positioning means, of a pair of end embracing wipers for wiping the margin of the upper inwardly about an end of the shoe, means for operating said wipers, a plurality of tackers mounted independently of the wipers for movements inwardly into position for fastening the margin of the upper, connections between said wiper operating means and the tackers for moving the tackers inwardly with the wipers, and a device for adjusting both wipers and their associated tackers simultaneously in relation to the shoe.

28. In a machine of the class described, the combination with shoe positioning means, of end embracing wipers mounted to close inwardly about an end of the shoe, means for operating said wipers, a device common to the different wipers for adjusting them together laterally of the shoe, and a plurality of tackers yieldingly controlled by the wiper operating means with respect to movements laterally of the shoe and arranged to be adjusted with the wipers by said wiper adjusting device.

29. In a machine of the class described, the combination with shoe positioning means, of end embracing wipers mounted to close inwardly about an end of the shoe, means for operating said wipers, side and corner tackers mounted independently of the wipers for movements inwardly over the shoe at its opposite sides, connections between the wiper operating means and the tackers for moving the tackers inwardly with the wipers, and a device arranged to act through said wiper operating means and the tacker connections to adjust the wipers and the tackers simultaneously in directions laterally of the shoe.

30. In a machine of the class described, the combination with shoe positioning means, of end embracing wipers mounted to close inwardly about an end of the shoe, means for adjusting said wipers laterally of the shoe, and side and corner tackers movable inwardly in converging paths at each side of the shoe and yieldingly controlled for adjustment with the wipers.

31. In a machine of the class described, the combination with shoe positioning means, of a wiper movable inwardly over the shoe, a tacker mounted independently of the wiper for movement over the shoe at the outer side of the wiper, and a thrust member positioned between the wiper and the tacker and spaced from the tacker to support the wiper against the pressure of the shoe materials.

32. In a machine of the class described, the combination with shoe positioning means, of a wiper movable inwardly over the shoe, a wiper slide for operating said wiper, a tacker overlying the wiper and mounted for sliding movement inward with the wiper, and a thrust member secured to the wiper slide between the wiper and the tacker and spaced from the tacker to support the wiper against the pressure of the shoe materials.

33. In a machine of the class described, the combination with shoe positioning means, of end embracing wipers mounted to close inwardly about an end of the shoe, tackers mounted independently of said wipers and guided for movements inwardly over the wipers, and thrust plates overlying the wipers and spaced from the tackers to support the wipers against the pressure of the shoe materials.

34. In a machine of the class described, the combination with shoe positioning means, of end embracing wipers comprising a pair of wiper plates mounted for closing movements each about an axis at an end of the shoe, an operating member movable lengthwise of the shoe to advance the plates over the shoe, members movable laterally of the shoe for closing said plates inwardly over the shoe, and a pin and slot guiding connection between each of said last named members and its associated wiper plate constructed to permit the plates to swing relatively to said members during their advancing and closing movements.

35. In a machine of the class described, the combination with shoe positioning means, of end embracing wipers mounted for advancing movement lengthwise of the shoe and for swinging movements laterally of the shoe, means for advancing said wipers lengthwise of the shoe, and members mounted independently of said wiper-advancing means to move laterally of the shoe for swinging the wipers inwardly during their advancing movement, said members having guide slots extending lengthwise of the shoe and the wipers having members movable in said slots to connect the wipers continuously to said members while permitting them to swing relatively to said members in their movements over the shoe.

36. In a machine of the class described, the combination with shoe positioning means, of end embracing wipers mounted for advancing movement lengthwise of the shoe and for swinging movements laterally of the shoe, an operating slide movable lengthwise of the shoe to advance said wipers, closing slides mounted independently of said operating slide for movements laterally of the shoe to swing the wipers inwardly, mechanism for operating said closing slides by the movement of said operating slide, and pin and slot connections between said closing slides and the wipers for maintaining the wipers continuously under the control of said closing slides during their advancing and closing movements over the shoe.

37. In a machine of the class described, the combination with shoe positioning means, of end embracing wipers mounted for advancing movement lengthwise of the shoe and for closing movements laterally of the shoe, and operating members movable respectively lengthwise and laterally of the shoe for advancing and closing the wipers over the shoe, said operating members having thereon thrust receiving abutments constructed to extend along the outer face of the wipers for substantial distances round the end and along the sides of the shoe to support the wipers against wedging action of the shoe materials.

38. In a machine of the class described, the combination with shoe positioning means, of end embracing wipers mounted for advancing movement lengthwise of the shoe and for closing movements laterally of the shoe, an operating slide movable lengthwise of the shoe to advance said wipers, and closing slides movable laterally of the shoe to close the wipers inwardly, each of said slides having fast thereon a thrust plate arranged to overlie the wipers and to support them against the wedging action of the shoe materials.

39. In a machine of the class described, the combination with shoe positioning means, of end embracing wipers mounted for advancing movement lengthwise of the shoe and for closing movements laterally of the shoe, means for advancing the wipers lengthwise of the shoe, closing slides movable laterally of the shoe to close the wipers inwardly, each of said closing slides having thereon supporting members between which the wipers are positioned, and a pin and slot guiding connection between each of said wipers and one of its supporting members.

40. In a machine of the class described, the combination with shoe positioning means, of end embracing wipers mounted for advancing movement lengthwise of the shoe and for closing movements laterally of the shoe, wiper advancing and closing slides movable together to advance and to close the wipers respectively, and a member connecting said slides for movement together and adjustable to vary the relation between the slides for adjusting the wipers relatively to the shoe.

41. In a machine of the class described, the combination with shoe positioning means, of end embracing wipers mounted for advancing movement lengthwise of the shoe and for closing movements laterally of the shoe, wiper advancing and closing sildes movable together to advance and to close the wipers respectively, a cross shaft connecting said slides and rotatable to effect a relative adjustment between the slides, and a rotatable adjusting member movable into or out of engagement with said shaft.

42. In a machine of the class described, the combination with shoe positioning means, of end embracing wipers mounted for advancing movement lengthwise of the shoe and for closing movements laterally of the shoe, an operating member movable lengthwise of the shoe to advance the wipers, mechanism connected to said member to move with it lengthwise of the shoe for closing the wipers inward laterally of the shoe, and means for adjusting said mechanism relatively to said operating member to vary the position of the wipers laterally of the shoe.

43. In a machine of the class described, the combination with shoe positioning means, of end embracing wipers mounted for advancing movement lengthwise of the shoe and for closing movements laterally of the shoe, means for advancing the wipers lengthwise of the shoe, gearing connections for closing the wipers laterally of the shoe during their advancing movement, and an adjusting member arranged to operate said gearing connections to adjust the wipers laterally of the shoe without affecting their position lengthwise of the shoe.

44. In a machine of the class described, the combination with shoe positioning means, of end embracing wipers mounted for advancing movement lengthwise of the shoe and for closing movements laterally of the shoe, a member movable to advance said wipers, rack bars movable with said member and connected to the wipers to close them inward laterally of the shoe, and means for moving the rack bars relatively to said member to adjust the wipers laterally of the shoe.

45. In a machine of the class described, the combination with shoe positioning means, of end embracing wipers mounted for advancing movement lengthwise of the shoe and for closing movements laterally of the shoe, an operating member movable lengthwise of the shoe to advance the wipers, mechanism movable with said member lengthwise of the shoe and connected to the wipers to close them inward laterally of the shoe, and a connection between said operating member and the closing mechanism comprising a shaft extending transversely of said member and rotatable to adjust said closing mechanism to determine different initial positions of the wipers laterally of the shoe.

46. In a machine of the class described, the combination with shoe positioning means, of end embracing wipers mounted for advancing movement lengthwise of the shoe and for closing movements laterally of the shoe, operating mechanism comprising different members movable lengthwise of the shoe for advancing and closing the wipers respectively, an adjusting device movable with said members in the operation of the wipers and also movable to effect a relative adjustment of the members to vary the initial positions of the wipers, and an adjusting members movable into or out of engagement with said adjusting device for effecting an adjustment of the wipers.

47. In a machine of the class described, the combination with shoe positioning means, of end embracing wipers mounted for advancing movement lengthwise of the shoe and for closing movements laterally of the shoe, an operating slide movable lengthwise of the shoe to advance the wipers, rack bars movable with said slide, gearing connections between said rack bars and the wipers for closing the wipers laterally of the shoe, and a shaft connecting said slide to the rack bars and having eccentrics thereon for adjusting the rack bars relatively to the slide through turning movement of the shaft.

48. In a machine of the class described, the combination with shoe positioning means, of end embracing wipers mounted for advancing movement lengthwise of the shoe and for closing movements laterally of the shoe, operating mechanism comprising different members movable together lengthwise of the shoe for advancing and closing said wipers respectively, a connection between said different members comprising a transverse shaft rotatable to effect a relative adjustment of the members to vary the position of the wipers laterally of the shoe, means for turning said shaft, and a device for retaining the shaft in different positions of adjustment.

49. In a machine of the class described, the combination with shoe positioning means, of end embracing wipers mounted for advancing movement lengthwise of the shoe and for closing movements laterally of the shoe, operating mechanism comprising different members movable together lengthwise of the shoe for advancing and closing said wipers respectively, an adjusting device movable with said members and also rotatable to effect a relative adjustment of the members to vary the initial positions of the wipers, and a member mounted on the frame of the machine for movement into or out of engagement with said adjusting device and rotatable manually to operate said device.

50. In a machine of the class described, the combination with means for operating on a shoe, of a shoe support movable to position a shoe in relation to said operating means, and mechanism for applying pressure yieldingly to said shoe support to position the shoe comprising a plurality of springs arranged for selective control to vary the pressure applied to said support.

51. In a machine of the class described, the combination with means for operating on a shoe, of a shoe support movable to position a shoe in relation to said operating means, and mechanism for applying pressure yieldingly to said shoe support to position the shoe comprising a plurality of springs and a device for rendering one of said springs either operative or substantially inoperative to act on the shoe support.

52. In a machine of the class described, the combination with means for operating on a shoe, of an abutment against which to press the rear end face of the shoe, a shoe support, and means for operating said shoe support to force the shoe yieldingly against said abutment comprising a plurality of springs through which to apply operating pressure to said support and a device for rendering one of said springs either operative or substantially inoperative to act on the shoe support for varying said pressure.

53. In a machine of the class described, the combination with means for operating on a shoe, of a clamping device for embracing and clamping the heel end of the shoe, a shoe support, a member for moving said shoe support to force the shoe into said clamping device, and a yielding operating connection between said member and the shoe support comprising a plurality of springs and a device for rendering one of said springs either operative or substantially inoperative to transmit pressure to the shoe support.

54. In a machine of the class described, the combination with a shoe support, of a shoe positioning member for engaging the bottom of a shoe on said support, and operating mechanism for imparting movement to said member to position the shoe comprising a rotatable shaft and a device operative through lengthwise movement of said shaft to effect a preliminary adjustment of the member.

55. In a machine of the class described, the combination with a shoe support, of a shoe positioning member for engaging the bottom of a shoe on said support, and operating mechanism for imparting movement to said member to position the shoe comprising a rotatable spiral gear movable also in the direction of its axis to effect a preliminary adjustment of the member.

56. In a machine of the class described, the combination with a shoe support, of a shoe positioning member for engaging the bottom of a shoe on said support, a rotatable shaft connected to said member and having a spiral gear thereon, operating means comprising a rack engaging said spiral gear for imparting movement to said member to position the shoe, and means for adjusting said spiral gear in the direction of its axis to effect a preliminary adjusting movement of the member.

57. In a machine of the class described, the combination with shoe positioning means, of a wiper for wiping the margin of the upper inwardly over the bottom of the shoe, a tacker comprising a tack holder and a driver for fastening the margin of the upper, operating means for moving said wiper inwardly between the tack holder and the bottom of the shoe and for positioning the wiper subsequently in a relatively retracted location to permit the fastening of the upper, and controlling means for said tack holder automatically operative to maintain it in a position to clear the wiper when the wiper moves inwardly between it and the shoe and to cause said tack holder to move subsequently toward the plane of the shoe bottom for the tacking operation.

58. In a machine of the class described, the combination with shoe positioning means, of a wiper for wiping the margin of the upper inwardly over the bottom of the shoe, tacker mechanism comprising a tack holder and a driver for fastening the portion of the upper wiped inwardly by said wiper, means for moving the wiper inwardly between the tack holder and the shoe and for subsequently retracting it beyond the tacking point, and means for moving said tack holder toward the plane of the shoe bottom for the tacking operation after the wiper has wiped the upper inwardly.

59. In a machine of the class described, the combination with shoe positioning means, of a wiper for wiping the margin of the upper inwardly over the bottom of the shoe, tacker mechanism movable inwardly with said wiper and relatively to which the wiper is further movable inwardly and then outwardly, said tacker mechanism comprising a tack holder and a driver for fastening the margin of the upper, means for operating said driver, and controlling means for said tack holder to cause it to move toward the plane of the shoe bottom in time relation to the operation of said driver.

60. In a machine of the class described, the combination with shoe positioning means, of a wiper for wiping the margin of the upper inwardly over the bottom of the shoe, a tack block mounted independently of the wiper and movable inwardly with said wiper, a tack holder mounted in said tack block for movement toward and from the plane of the shoe bottom, and controlling means for said tack holder to cause it to move toward the plane of the shoe bottom for the tacking operation and subsequently to withdraw from said plane.

61. In a machine of the class described, the combination with shoe positioning means, of end embracing wipers for wiping the margin of the upper inwardly about an end of the shoe, a plurality of tackers arranged about the end of the shoe for fastening the margin of the upper, said tackers comprising tack holders mounted for movement toward and from the plane of the shoe bottom, and controlling means for said tack holders automatically operative to cause them to move toward the plane of the shoe bottom for the tacking operation and subsequently to withdraw from said plane.

62. In a machine of the class described, the combination with shoe positioning means, of end embracing wipers for wiping the margin of the upper inwardly about an end of the shoe, a plurality of tackers mounted to move inwardly with said wipers about the end of the shoe and relatively to which the wipers are further movable inwardly and then outwardly, said tackers comprising tack holders mounted for movements also toward and from the plane of the shoe bottom, drivers associated with the different tack holders, and means for moving said tack holders toward and from the plane of the shoe bottom in time relation to the operation of the drivers.

63. In a machine of the class described, the combination with shoe positioning means, of end embracing wipers for wiping the margin of the upper inwardly about an end of the shoe, a plurality of tackers arranged about the end of the shoe and comprising tack holders and drivers, means for moving said wipers inwardly between the tack holders and the bottom of the shoe in one over-wiping operation and for moving them subsequently inward a lesser distance to position them for the upper fastening operation, and means for maintaining said tack holders in position to clear the wipers in the greater movement of the wipers over the shoe and to cause them subsequently to move toward the plane of the shoe bottom for the upper fastening operation.

64. In a heel seat lasting machine, the combination with heel seat lasting mechanism, and a holddown member for engaging the bottom of a shoe to determine the relation of the shoe to said lasting mechanism, of a shoe support mounted for manual movement to carry the shoe toward said lasting mechanism, and a device arranged to be rendered operative prior to the starting of the machine, in time relation to said movement of the shoe support and after said support has arrived substantially at the end of said movement, to move the shoe heightwise to jack it against the holddown member.

65. In a heel seat lasting machine, the combination with heel seat lasting mechanism, and a holddown member for engaging the bottom of a shoe to determine the relation of the shoe to said lasting mechanism, of a shoe support mounted for swinging movement in the direction of the length of the shoe to carry the shoe toward said lasting mechanism and for movement in the direction of the height of the shoe to jack the shoe against said holddown member, and spring means arranged to be tripped for imparting to the support said last named movement.

66. In a heel seat lasting machine, the combination with heel seat lasting mechanism, and a holddown member for engaging the bottom of a shoe to determine the relation of the shoe to said lasting mechanism, of a shoe support mounted for movement to carry the shoe toward said lasting mechanism and also for movement in the direction of the height of the shoe to jack the shoe against said holddown member, spring means for imparting said last named movement to the shoe support, a device for retaining said spring means in condition to act, and mechanism operated by said movement of the support toward the lasting mechansim to cause the retaining device to release said spring means.

67. In a heel seat lasting machine, the combination with heel seat lasting wipers, of a shoe support mounted for rearward swinging movement to carry a shoe toward said wipers and for additional movement heightwise of the shoe to jack the shoe in relation to the wipers, jacking mechanism arranged to be rendered operative by said swinging movement of the shoe support to impart to the support said jacking movement, and means automatically operative subsequently to restore said jacking mechanism to its original condition for operation on another shoe.

68. In a heel seat lasting machine, the combination with heel seat lasting wipers, of a shoe support mounted for movement to carry a shoe toward said wipers and for additional movement heightwise of the shoe to jack the shoe in relation to the wipers, spring means arranged to be tripped by said first named movement of the shoe support for imparting to the support said last named movement, and mechanism automatically operative in the course of the cycle of operations of the machine to restore said spring means to its original condition for operation on another shoe.

69. In a heel seat lasting machine, the combination with heel seat lasting mechanism, and a holddown member for engaging the bottom of a shoe to determine the relation of the shoe to said lasting mechanism, of a shoe support mounted for movement to carry the shoe toward said lasting mechanism and for additional movement heightwise of the shoe to jack the shoe against said holddown member, spring means arranged to be rendered operative by said first named movement of the shoe support to impart to the support said last named movement, power means for imparting to the shoe support subsequently additional jacking movement, and mechanism arranged to be operated by said power means to return said spring means into position for operation on another shoe.

70. In a heel seat lasting machine, the combination with power operated lasting mechanism comprising a heel band and wipers, and a holddown for engaging the heel seat portion of the sole of a shoe to determine the relation of the shoe to the wipers, of a shoe support mounted to be swung rearwardly by the operator to carry the shoe into the heel band, and spring means arranged to be tripped for jacking the shoe upwardly against the holddown before the machine is started.

71. In a heel seat lasting machine, the combination with power operated lasting mechanism comprising a heel band and wipers, and a holddown for engaging the heel seat portion of the sole of a shoe to determine the relation of the shoe to the wipers, of a shoe support mounted to be swung rearwardly by the operator to carry the shoe into the heel band, spring means for jacking the shoe upwardly against the holddown before the machine is started, and means automatically operative after the machine is started to return said spring means into position to operate on another shoe.

72. In a machine of the class described, the combination with means for operating on a shoe, of a shoe support mounted for rearward swinging movement to carry a shoe toward said operating means, said support being movable also heightwise of the shoe to jack the shoe, spring means arranged to be tripped by said rearward swinging movement of the shoe support for imparting to the support its jacking movement, and means automatically operative to restore said spring means subsequently to its original condition for operation on another shoe.

73. In a machine of the class described, the combination with means for operating on a shoe, of a shoe support movable to position a shoe in relation to said operating means, spring operated means for imparting to said support its positioning movement, and a device for retarding the movement imparted to the support by said spring means.

74. In a machine of the class described, the combination with means for operating on a shoe, of a shoe support mounted for movement to carry a shoe toward said operating means and for additional movement heightwise of the shoe to jack the shoe, spring mechanism arranged to be tripped by said first named movement of the shoe support for imparting to the support said last named movement, and a dash-pot for retarding the movement imparted to the support by said spring mechanism.

75. In a machine of the class described, the combination with means for operating on a shoe, of a shoe support mounted for rearward movement to position a shoe in relation to said operating means and for additional movement heightwise of the shoe to jack the shoe, spring means arranged to be tripped for imparting said jacking movement to the shoe support, said support being movable forwardly to withdraw the shoe, and means operative in response to said forward movement of the shoe support for restoring said spring means substantially to its original condition.

76. In a machine of the class described, the combination with means for operating on a shoe, of a shoe support mounted for rearward movement to position a shoe in relation to said operating means and for additional movement heightwise of the shoe to jack the shoe, jacking mechanism automatically operative in response to said first named movement of the shoe support to impart to the support said last named movement, said support being movable forwardly to withdraw the shoe before it is operated upon, and means operated by said forward movement of the shoe support to restore said jacking mechanism substantially to its original condition.

77. In a machine of the class described, the combination with means for operating on a shoe, of a shoe support mounted for rearward movement to carry a shoe toward said operating means and for additional movement heightwise of the shoe to jack the shoe, spring mechanism arranged to be tripped by said first named movement of the shoe support for imparting to the support said last named movement, means automatically operative in the cycle of operations of the machine to restore said spring mechanism to its original condition, and additional means arranged to be operated by reverse forward movement of the shoe support prior to the operation of the machine for restoring said spring mechanism substantially to its original condition.

78. In a machine of the class described, the combination with means for operating on a shoe, and a holddown for engaging the bottom of the shoe, of a shoe support mounted for rearward movement to carry a shoe toward said operating means and for additional movement to jack the shoe against said holddown, spring mechanism automatically operative in response to the rearward movement of the shoe support to impart to the support said jacking movement, a device enabling the operator to depress the shoe and to move the shoe support forwardly prior to the operation of the machine, and mechanism arranged to be operated by such forward movement of the shoe support to restore said spring mechanism substantially to its original condition.

79. In a machine of the class described, the combination with means for operating on a shoe, of a shoe support movable in opposite directions to position a shoe and to withdraw the shoe, spring mechanism arranged to be tripped to move the shoe also in the direction of its height, and a link connected to said spring mechanism to restore said mechanism substantially to its original condition through withdrawing movement of the shoe support.

80. In a machine of the class described, the combination with means for operating on a shoe, of a shoe support movable to position a shoe in relation to said operating means, a slide for imparting positioning movement to the shoe support, power operated mechanism for controlling said slide, and an additional spring operated slide arranged to impart to said first named slide a preliminary movement to position the shoe support.

81. In a machine of the class described, the combination with means for operating on a shoe, of a shoe support for positioning a shoe in relation to said operating means, an elevating slide for said shoe support, power mechanism for controlling said slide, a second slide for imparting a preliminary movement to said first slide, a spring for operating said second slide, and a pawl and ratchet device for controlling the operation of said spring.

82. In a machine of the class described, the combination with means for operating on a shoe, of a shoe support mounted for rearward movement, a slide for elevating said shoe support, power mechanism for controlling said slide, a second slide for imparting a preliminary upward movement to said first slide, spring means for operating said second slide, and a retaining device arranged to hold said second slide normally depressed and to be operated by the rearward movement of the support to release said slide.

83. In a machine of the class described, the combination with means for operating on a shoe, of a shoe support mounted for rearward movement, a slide for elevating said shoe support, power mechanism for controlling said slide, a second slide for imparting a preliminary upward movement to said first slide, spring means for operating said second slide, a retaining device for said second slide arranged to be operated to release said slide as the support is moved rearwardly, and mechanism automatically operative subsequently to return said slide to its initial depressed position.

It testimony whereof I have signed my name to this specification.

CHARLES H. HOYT.